United States Patent
Nakagawa

(10) Patent No.: US 7,055,099 B2
(45) Date of Patent: *May 30, 2006

(54) CHARACTER INPUT APPARATUS AND STORAGE MEDIUM IN WHICH CHARACTER INPUT PROGRAM IS STORED

(75) Inventor: Katsuya Nakagawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 379 days.

This patent is subject to a terminal disclaimer.

(21) Appl. No.: 10/457,550

(22) Filed: Jun. 10, 2003

(65) Prior Publication Data

US 2003/0212674 A1    Nov. 13, 2003

Related U.S. Application Data

(62) Division of application No. 09/269,976, filed as application No. PCT/JP97/03419 on Sep. 24, 1997, now Pat. No. 6,616,703.

(30) Foreign Application Priority Data

Oct. 16, 1996    (JP)    ................... 08-273829

(51) Int. Cl.
    *G06F 15/00*    (2006.01)
(52) U.S. Cl. .......................... 715/530; 704/9
(58) Field of Classification Search ............... 715/530, 715/531, 500; 704/7–9
    See application file for complete search history.

(56) References Cited

U.S. PATENT DOCUMENTS

| | | | |
|---|---|---|---|
| 5,068,789 A | 11/1991 | van Vliembergen | |
| 5,095,432 A | 3/1992 | Reed | |
| 5,396,419 A | 3/1995 | Morimoto | |
| 5,523,945 A | 6/1996 | Satoh et al. | |
| 5,537,317 A | 7/1996 | Schabes et al. | |
| 5,541,838 A | 7/1996 | Koyama et al. | |
| 5,557,794 A | 9/1996 | Matsunaga et al. | |
| 5,678,051 A * | 10/1997 | Aoyama ................ | 704/2 |
| 5,734,749 A | 3/1998 | Yamada et al. | |
| 5,786,776 A | 7/1998 | Kisaichi et al. | |
| 5,812,863 A | 9/1998 | Ishikawa | |
| 5,813,018 A * | 9/1998 | Kaji et al. ............ | 715/502 |
| 5,828,991 A | 10/1998 | Skiena et al. | |
| 5,835,922 A * | 11/1998 | Shima et al. .......... | 715/522 |
| 5,844,561 A | 12/1998 | Tanimoto et al. | |

(Continued)

FOREIGN PATENT DOCUMENTS

JP    62-202259    9/1987

(Continued)

OTHER PUBLICATIONS

U.S. Appl. No. 09/269,976, filed Apr. 8, 1999.

(Continued)

*Primary Examiner*—Cong-Lac Huynh
(74) *Attorney, Agent, or Firm*—Nixon & Vanderhye P.C.

(57) ABSTRACT

An operation such as changing the coordinates of a specified position is performed on a two-dimensional display screen 103 of a display unit 5 by using an input pen 102, a touch-panel, etc., as an operation input unit 103 to shift the list of candidate character strings which is displayed on the display screen at the initial screen. The contents of the list of the candidate character strings which are displayed on the display screen 103 are continuously changed until a desired candidate character string appears on the screen 103.

11 Claims, 19 Drawing Sheets

U.S. PATENT DOCUMENTS

| | | | |
|---|---|---|---|
| 5,864,788 A * | 1/1999 | Kutsumi | 704/2 |
| 5,959,629 A | 9/1999 | Masui | |
| 5,960,385 A | 9/1999 | Skiena et al. | |
| 5,999,896 A | 12/1999 | Richardson et al. | |
| 6,041,323 A | 3/2000 | Kubota | |
| 6,064,952 A | 5/2000 | Imanaka et al. | |
| 6,067,510 A * | 5/2000 | Kimura et al. | 704/7 |
| 6,067,520 A * | 5/2000 | Lee | 704/270 |
| 6,089,034 A | 7/2000 | Lake et al. | |
| 6,097,841 A | 8/2000 | Gunji et al. | |
| 6,104,990 A | 8/2000 | Chaney et al. | |
| 6,236,959 B1 | 5/2001 | Weise | |
| 6,266,631 B1 | 7/2001 | Higginbotham et al. | |
| 6,305,942 B1 | 10/2001 | Block et al. | |
| 6,360,197 B1 | 3/2002 | Wu et al. | |
| 6,366,908 B1 | 4/2002 | Chong et al. | |
| 6,426,740 B1 * | 7/2002 | Goto et al. | 345/157 |
| 6,470,307 B1 | 10/2002 | Turney | |
| 6,662,152 B1 * | 12/2003 | Sako et al. | 704/9 |
| 2002/0002547 A1 * | 1/2002 | Sako et al. | 707/1 |
| 2002/0102025 A1 * | 8/2002 | Wu et al. | 382/229 |

FOREIGN PATENT DOCUMENTS

| | | |
|---|---|---|
| JP | 63-20562 | 1/1988 |
| JP | 5-165567 | 7/1993 |
| JP | 5-173685 | 7/1993 |
| JP | 6-19883 | 1/1994 |
| JP | 6-51891 | 2/1994 |
| JP | 6-285260 | 10/1994 |
| JP | 9-222944 | 8/1997 |

OTHER PUBLICATIONS

Riloff et al., Automated Dictionary Construction for Information Extraction from Text, Mar. 1993, IEEE, pp. 93-99.

* cited by examiner

FIG.3

| | | | |
|---|---|---|---|
| 39183 | hyperthyroid | noun | 3 |
| 39184 | hysteresis | noun | 1 |
| 39185 | hysteria | noun | 1 |
| 39186 | hysteric | noun | 1 |
| 39187 | hysteron | noun | 1 |
| 39188 | I | noun | 32 |
| 39189 | iambic | adjective | 1 |
| 39191 | Iberia | noun | 1 |
| 39192 | ibex | noun | 1 |
| 39193 | Ibiden | adjective | 1 |

FIG.4

| | | |
|---|---|---|
| Can | auxiliary verb | 31 |
| Do | auxiliary verb | 32 |
| He | noun | 32 |
| How | interrogative | 30 |
| I | Noun | 32 |
| It | Noun | 32 |
| She | Noun | 30 |
| The | article | 32 |
| This | noun | 31 |
| You | noun | 30 |

| | | |
|---|---|---|
| am | verb | 31 |
| did | auxiliary verb | 30 |
| do | auxiliary verb | 32 |
| go | verb | 30 |
| have | verb | 32 |
| hope | verb | 30 |
| take | verb | 31 |
| think | verb | 30 |
| want | verb | 30 |
| will | auxiliary verb | 31 |

FIG. 6

```
I will ☒   ← 103a
```

| | | |
|---|---|---|
| be | verb | 32 |
| come | verb | 30 |
| do | verb | 32 |
| get | verb | 31 |
| go | verb | 31 |
| have | verb | 32 |
| make | verb | 32 |
| take | verb | 32 |
| think | verb | 30 |
| use | verb | 30 |

FIG. 7

```
I will take ☒   ← 103a
```

| | | |
|---|---|---|
| a | article | 32 |
| away | preposition | 30 |
| back | preposition | 30 |
| her | noun | 30 |
| him | noun | 30 |
| it | noun | 32 |
| off | preposition | 31 |
| out | preposition | 31 |
| the | article | 32 |
| up | preposition | 30 |

```
I will take a ▨
```
103a

| | | | |
|---|---|---|---|
| book | noun | | 30 |
| cat | noun | | 30 |
| dog | noun | | 30 |
| good | adjective | | 30 |
| little | adjective | | 32 |
| lot | noun | | 32 |
| rest | noun | | 31 |
| time | noun | | 32 |
| train | noun | | 30 |
| work | noun | | 32 |

52a, 52b, 103 book, cat, dog, good, little, lot, rest, time, train, work → Processing for enlarging → cat, chance, clear, cow, damaged, dangerous, date, day, difficult, dog

FIG.9

I will take a ▨ —103a

| | | |
|---|---|---|
| cat | noun | 30 |
| chance | noun | 25 |
| clear | adjective | 26 |
| cow | noun | 24 |
| damaged | past participle | 25 |
| dangerous | adjective | 28 |
| date | noun | 29 |
| day | noun | 28 |
| difficult | adjective | 28 |
| dog | noun | 30 |

FIG.10

I will take a day ▨ —103a

| | | |
|---|---|---|
| and | conjunction | 32 |
| as | adverb | 31 |
| for | preposition | 30 |
| from | preposition | 30 |
| in | preposition | 31 |
| of | preposition | 32 |
| off | preposition | 31 |
| on | preposition | 32 |
| to | infinitive | 32 |
| with | preposition | 31 |

FIG.11

| I will take a day off ▨ | | |
|---|---|---|
| and | conjunction | 32 |
| as | adverb | 31 |
| for | preposition | 30 |
| from | preposition | 30 |
| in | preposition | 31 |
| on | preposition | 32 |
| today | noun | 31 |
| tomorrow | noun | 32 |
| with | preposition | 31 |
| yesterday | noun | 32 |

FIG.12

| I will take a day off tomorrow ▨ | | |
|---|---|---|
| afternoon | noun | 31 |
| and | conjunction | 30 |
| at | preposition | 31 |
| by | noun | 32 |
| evening | noun | 30 |
| morning | noun | 32 |
| night | noun | 32 |
| with | preposition | 31 |
| punctuation mark | | 32 |
| punctuation mark | | 32 |

FIG. 17

| Registered nord | Pronunciation | Appearance frequency P1 | Appearance frequency P2 | | Appearance frequency P8 |
|---|---|---|---|---|---|
| tomorrow | Japanese phonetic characters of "tomorrow" | 32 | 32 | | 32 |
| before leaving | Japanese phonetic characters of "before leaving" | 32 | 32 | | 32 |
| before coming home | Japanese phonetic characters of "before coming home" | 1 | 1 | | 32 |
| today | Japanese phonetic characters of "today" | 32 | 32 | | 32 |
| tonight | Japanese phonetic characters of "tonight" | 10 | 32 | | 32 |
| will eat | Japanese phonetic characters of "will eat" | 1 | 5 | | 32 |
| to eat | Japanese phonetic characters of "to eat" | 1 | 5 | | 32 |
| lunch | Japanese phonetic characters of "lunch" | 1 | 10 | | 32 |
| to drink | Japanese phonetic characters of "to drink" | 1 | 10 | | 32 |
| dinner | Japanese phonetic characters of "dinner" | 1 | 10 | | 32 |

FIG.22
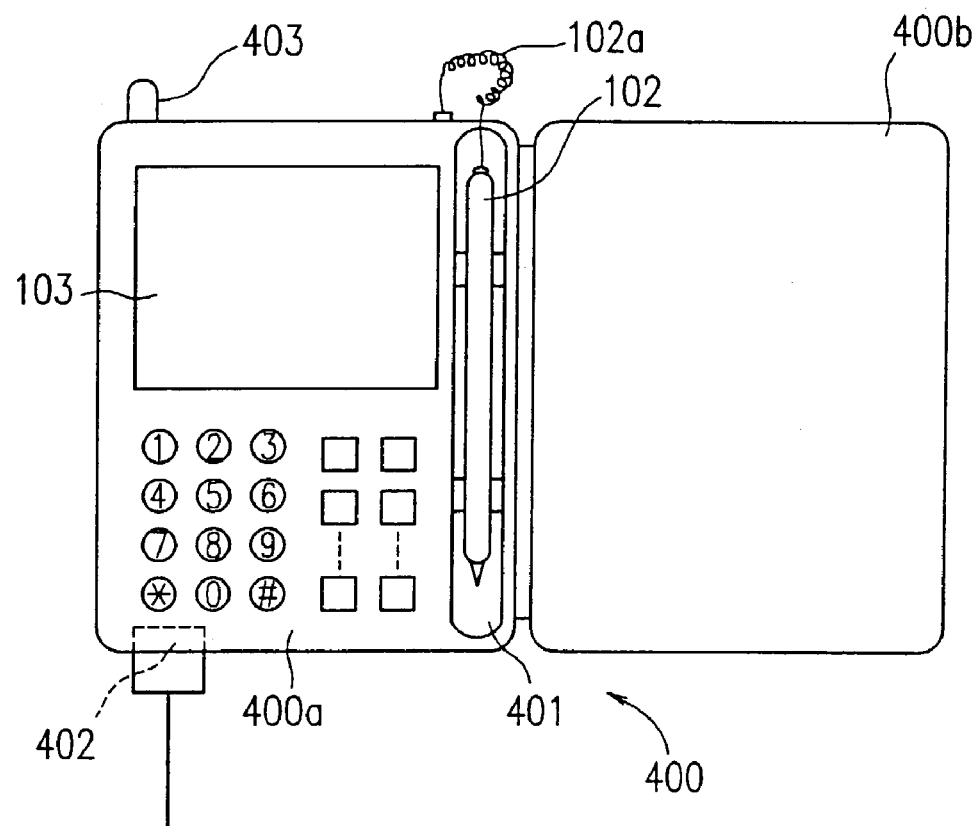
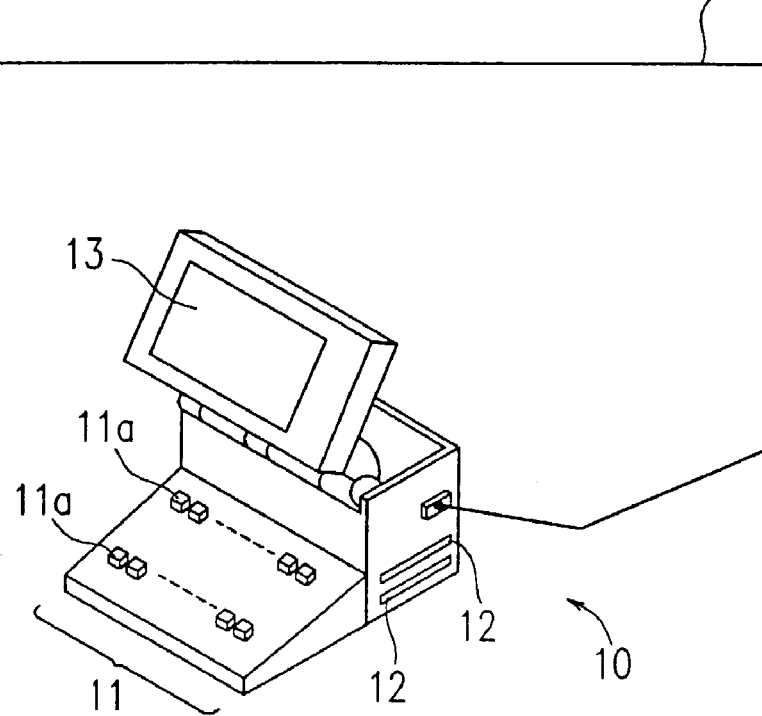

ically widespread.
CHARACTER INPUT APPARATUS AND STORAGE MEDIUM IN WHICH CHARACTER INPUT PROGRAM IS STORED This application is a Divisional of application Ser. No. 09/269,976 filed Apr. 8, 1999 (now U.S. Pat. No. 6,616,703), the entire content of which is hereby incorporated by reference in this application, which is a 371 (national stage) of PCT/JP97/03419 filed Sep. 24, 1997, which designates the United States, which claims priority on JP 08-273829 filed Oct. 16, 1996.

TECHNICAL FIELD

The present invention relates to a character input apparatus and a storage medium in which a character input program is stored. In particular, the present invention relates to a character input apparatus and a storage medium which realize a search function of smoothly and rapidly searching a character string consisting of at least one character, forming a sentence and having a meaning, from a character string dictionary, storing such character strings for searching.

The present invention relates to a structure in which, for example, in a portable terminal apparatus and a word processor having a pointing device such as a pressure-sensitive tablet instead of a keyboard, an ordinary input of sentences is performed for writing papers and E-mail by using the pointing device. Furthermore, the present invention relates to a structure and a program for allowing disabled people who have difficulty in inputting sentences by using a keyboard to input sentences in information equipment which requires an ordinary input of sentences for performing the above-mentioned operation.

BACKGROUND ART

Conventionally, as a sentence forming apparatus, a word processor 10 as shown in FIG. 23 is generally widespread. Such a word processor 10 has a keyboard 11 including a plurality of keys 11a which have such a size that people can easily operate by pressing them with their fingers, whereby input processing of sentences can be performed by using the keyboard 11. In FIG. 23, reference numerals 12 and 13 denote insert slots for floppy disks and a liquid crystal panel, respectively.

In recent years, a portable terminal apparatus such as an electronic organizer equipped with a sentence input function of the word processor as described above has been put to practical use. Representative examples of methods for performing input of sentences in such a portable terminal apparatus will be described below.

According to a first method, input of sentences is performed by using a keyboard which is much smaller than the keyboard 11 of the ordinary word processor 10 shown in FIG. 23 (e.g., which has a size of the palm of a hand).

According to a second method, a small keyboard is displayed on a display screen of the above-mentioned portable terminal apparatus, pressing of a displayed portion of a key on the display screen is detected by a pressure-sensitive sheet, and input processing of sentences is performed by using the displayed keyboard.

According to a third method, a handwriting detection portion utilizing a pressure-sensitive sheet is provided in the above-mentioned portable terminal apparatus, handwriting formed on the pressure-sensitive sheet is detected to recognize a pattern of characters, and input processing of sentences is performed by utilizing the recognition of such a character pattern.

However, the above-mentioned sentence input methods in the portable terminal apparatus have the following problems.

First, in the first method using a small keyboard, the keyboard is too small for people to manipulate the keys with their fingers, which makes it difficult to perform a key operation. Furthermore, it is required for those who are not familiar with a keyboard to look for a character on the top of each key for a key operation, and in inputting Japanese, after characters are input, they are required to be converted into appropriate kanji characters (i.e., Chinese characters), which results in a very bothersome input operation.

The second method in which a small keyboard is displayed on a display screen of a portable terminal apparatus also has the problems similar to those in the first method using a keyboard operation.

In the third method in which a pattern of input characters is recognized from handwriting by using a pressure-sensitive sheet, in the case where an unknown kanji character is input, it is required that the kanji character is once phonetically input by handwriting in the form of hiragana characters (i.e., Japanese phonetic characters), and the hiragana characters are converted into a kanji character. Thus, input of kanji characters is not necessarily performed efficiently by pattern recognition. Furthermore, in the case where there is a problem of a recognition ratio of handwritten characters (i.e., in the case where a recognition ratio is small), handwriting input is required to be frequently re-done. In order to enhance a recognition ratio, it is required to contrive a structure for performing pattern recognition of handwritten characters, leading to an increase in cost.

It is needless to say that the above-mentioned first to third methods can make it difficult for visually impaired people to perform input operation of characters.

Furthermore, to input characters by using a keyboard becomes very bothersome work for disabled people even in a tabletop information equipment equipped with an ordinary keyboard, as well as the above-mentioned portable terminal apparatus.

On the other hand, there is a game machine or the like in which characters can be input by using a pointing device such as a cross-pad, a trackball or a joystick, and a selection button. According to this method for inputting characters, hiragana characters are specified one by one, using the cross-pad and the selection button, for example, on a table in which all the hiragana characters are disposed in a predetermined arrangement, and a character name in a game, simple instruction sentences are input.

Accordingly, the method for inputting characters used in such a game machine is not intended for writing ordinary papers, E-mail, etc., and to write papers by using this method for inputting characters is very inefficient and impractical.

DISCLOSURE OF THE INVENTION

The present invention solves the above-mentioned conventional problems, and its objective is to provide a character input apparatus and a recording medium in which a character input program is stored, which enable characters to be input at a high speed only by a pointing operation on a display screen, whereby characters can be input without using a keyboard and even when kanji characters in a phrase which is desired to be input are unknown.

A character input apparatus of the present invention includes: a character string dictionary which stores a number of character strings, consisting of at least one character and having a predetermined meaning, in a predetermined storage order; and an operation input unit which generates various instructing signals in accordance with an operation of an operator, the apparatus selecting a character string from the character string dictionary based on the instructing signal and inputting the character string, the apparatus comprising: display means having a display screen for displaying the selected character string and listing candidate character strings from which the character string is selected; a candidate character string extracting portion including selection means for selecting a predetermined character string from a plurality of the listed candidate character strings, based on a selection instructing signal generated by an operation in the operation input unit, and extraction threshold value changing means for continuously changing an extraction threshold value of character strings, based on a threshold value change instructing signal generated by an operation in the operation input unit, the candidate character string extracting portion extracting character strings from all the character strings stored in the character string dictionary as the candidate character strings, based on a large and small relationship between extraction priorities of the character strings and the extraction threshold value; and display control means for controlling the display means in such a manner that the candidate character strings extracted from the candidate character string extracting portion are listed and the character string selected by the selecting means is displayed on the display screen, wherein the operation input unit has a position specifying member for specifying a position on the display screen, and is designed in such a manner that the threshold value changing signal is generated by an operation of the position specifying member, and the display control means controls the display means in such a manner that, in regions on both sides of the position specified by the position specifying member on the display screen, the listed candidate character strings are shifted in an opposite direction to each other with respect to the specified position, when the number of the candidate character strings is increased or decreased in accordance with a change in the extraction threshold value.

In one embodiment, the character string dictionary, the candidate character string extracting portion, the display means, and the display control means are provided in an information equipment body for displaying and processing communication information, the operation input unit is provided in a remote control device separated from the information equipment body, for remotely controlling the information equipment body, a position specifying signal generated by an operation of the position specifying member in the operation input unit and the selection instructing signal generated by an operation in the operation input unit are transmitted from a transmitting portion of the remote control device to the information equipment body, a position is specified on the display screen of the display means provided in the information equipment body, based on the transmitted position specifying signal, and the candidate character strings are selected by the selecting means, based on the transmitted selection specifying signal.

In one embodiment, the display means includes, on the display screen, a selection character string display region for displaying the selected character string and a candidate character string display region for listing a predetermined number of candidate character strings from which the character string is selected, the selecting means selects a predetermined character string from a plurality of the candidate character strings listed in the candidate character string display region, based on the selection instructing signal generated by an operation in the operation input unit, the display control means controls the display means in such a manner that the candidate character strings extracted from the candidate character string extracting portion are listed in the candidate character string display region on the display screen and the character string selected by the selecting means is displayed in the selection character string display region on the display screen, the position specifying member in the operation input unit specifies a position on a two-dimensional coordinate corresponding to the candidate character string display region on the display screen, and the display control means controls the display means in such a manner that, in the candidate character string display region on the display screen, the listed candidate character strings are shifted so as to spread to upper and lower sides with respect to the position specified by the position specifying member, when the number of the candidate character strings is increased with a decrease in the extraction threshold value, and in the candidate character string display region on the display screen, the listed candidate character strings are shifted from both sides of the position specified by the position specifying member to the specified position, when the number of candidate character strings is decreased with an increase in the extraction threshold value.

In one embodiment, the candidate character string extracting portion compares an extraction priority of each character string in the character string dictionary with the extraction threshold value, and repeats first processing of extracting character strings whose extraction priorities are larger than the extraction threshold value from the character string dictionary and second processing of changing the extraction threshold value based on the threshold value change instructing signal generated by an operation in the operation input unit.

In one embodiment, the selecting means selects a predetermined candidate character string from a plurality of candidate character strings listed on the display screen whose extraction priorities are larger than the set extraction threshold value, based on the selection instructing signal generated by an operation in the operation input unit.

In one embodiment, the character string dictionary stores each character string, at least together with an extraction priority based on an appearance frequency thereof, and part of speech information based on the grammar of a language of the character strings to be input, a grammar dictionary is provided, which stores grammar information including a conjunction relationship between character strings disposed adjacent to each other, determined by the part of speech of the character strings in language of the character strings to be input, and the candidate character string extracting portion reads the part of speech information from the character string dictionary, regarding a latest character string among the character strings selected by the selecting means, and extracts character strings, which may come next to the latest selected character string and have extraction priorities larger than the extraction threshold value, as candidate character strings from the character string dictionary, based on the read part of speech information and the grammar information stored in the grammar dictionary.

In one embodiment, the candidate character string extracting portion includes appearance frequency updating means for updating an appearance frequency of each character string in the character string dictionary, based on a selection determining signal from the selecting means, and preferentially extracts character strings having large appearance frequencies as candidate character strings from the character string dictionary, considering that larger appearance frequencies correspond to higher extraction priorities.

In one embodiment, the character string dictionary and the candidate character string extracting portion are provided in a tabletop character input apparatus body, the operation input unit, the display means, and the display control means are provided in a portable terminal portion separated from the character input apparatus body, and the character input apparatus body and the portable terminal portion respectively have a transmitting/receiving portion for transmitting and receiving data through a wired channel or a radio channel, an operation signal generated by an operation of the position specifying member of the operation input portion in the portable terminal portion is transmitted to the candidate character string extracting portion in the character input apparatus body through the wired channel or the radio channel as data representing the specified position on the display screen of the display means in the portable terminal portion, the selection instructing signal generated by an operation in the operation input unit is transmitted to the selecting means in the character input apparatus body through the wired channel or the radio channel, extraction candidate character string data regarding the candidate character strings extracted by the candidate character string extracting portion is transmitted to the display control means in the portable terminal portion through the wired channel or the radio channel, and selection character string data regarding the character string selected by the selecting means is transmitted to the display control means in the portable terminal portion through the wired channel or the radio channel.

In one embodiment, the character string dictionary includes dictionary information as a language dictionary which stores information of a meaning of each character string, as well as each of the character strings, the operation input unit generates a meaning display instructing signal with respect to any character string displayed on the display screen by a predetermined operation, the display means forms a window for displaying a meaning on the display screen, based on the meaning display instructing signal from the operation input unit, and the display control means displays information of a meaning of a corresponding character string in the window for displaying a meaning formed on the display screen, based on the meaning display instructing signal.

In one embodiment, a language of the character strings to be input is Japanese or Chinese, a plurality of character strings are stored in an order based on a pronunciation thereof in the character string dictionary, and homonymous character strings are stored in an order based on the number of strokes (in a Chinese character) of a first character included in each of the character strings.

Furthermore, a recording medium of the present invention stores a program for implementing the above-mentioned character input apparatus of the present invention in a computer.

Hereinafter, the function of the present invention will be described.

According to the present invention, the candidate character string extracting portion, which extracts character strings from all the character strings stored in the character string dictionary as the candidate character strings, based on a large and small relationship between extraction priorities of the character strings and the extraction threshold value, includes extraction threshold value changing means for continuously changing an extraction threshold value of character strings, based on a threshold value change instructing signal generated by an operation in the operation input unit. Therefore, the number of candidate character strings to be extracted from the character string dictionary can be continuously changed by an operation in the operation input unit.

Furthermore, the display control means, which lists extracted candidate character strings on the display screen of the display means, controls the display means in such a manner that, in regions on both sides of the position specified by the position specifying member of the operation input unit on the display screen, the listed candidate character strings are shifted in an opposite direction to each other with respect to the specified position, when the number of the candidate character strings is increased or decreased in accordance with a change in the extraction threshold value. Therefore, the intended candidate character string can be rapidly displayed on the display screen.

Thus, candidate character strings listed at the initial time are shifted on the display screen, and a content of listed candidate character strings is continuously changed until the intended candidate character string appears on the display screen, by an operation such as changing a coordinate of a specified position on a two-dimensional display screen, using a mouse, a tablet, or the like as the operation input member. Therefore, a word, a clause, or a sentence can be successively input as a character string by selecting an appropriate character string from a list of candidate character strings which dynamically change by a selection operation of the operation input unit. In this case, unlike input of characters by using a keyboard, there is no dependence on language in an input operation, and a sentence can be correctly input, even in the case where spellings of Chinese characters in Japanese, English, etc. are not known.

In one embodiment, the character string dictionary, the candidate character string extracting portion, the display means, and the display control means are provided in an information equipment body for displaying and processing communication information, and the operation input unit is provided in a remote control device separated from the information equipment body, for remotely controlling the information equipment body. Therefore, when a position specifying operation and a selection operation in the operation input unit are conducted on the remote control device side, a position specifying signal and a selection instructing signal generated thereby are transmitted to the information equipment body side, so that extraction and selection of candidate character strings can be performed by a remote operation.

In one embodiment, a selection character string display region for displaying the selected character string and a candidate character string display region for listing a predetermined number of candidate character strings from which the character string is selected are set on the display screen of the display means. Therefore, candidate character strings and a selected character string are displayed in predetermined regions on the display screen, and it becomes easy to distinguish the candidate character strings from the selected character string on the display screen.

In one embodiment, the candidate character string extracting portion compares an extraction priority of each character string in the character string dictionary with the extraction threshold value, and repeats first processing of extracting character strings whose extraction priorities are larger than the extraction threshold value from the character string dictionary and second processing of changing the extraction threshold value based on the threshold value change instructing signal generated by an operation in the operation input unit. Therefore, in the case where there is no intended candidate character string in candidate character strings listed on the display screen, a content of candidate character strings to be listed is continuously changed by an operation in the operation input unit in accordance with extraction priorities, whereby the intended character string can be obtained as a candidate character string on the display screen. Thus, the intended character string can be searched efficiently and rapidly.

In one embodiment, the selecting means selects a predetermined candidate character string from a plurality of candidate character strings listed on the display screen whose extraction priorities are larger than the set extraction threshold value, based on the selection instructing signal generated by an operation in the operation input unit. Therefore, when the intended character string is displayed as a candidate character string on the display screen, this character string can be selected by the operation input unit. Thus, a required sentence can be input by placing the selected character string after the previously selected character string by an operation of the operation input unit.

In one embodiment, the character string dictionary stores each character string, together with an extraction priority thereof and part of speech information thereof, a grammar dictionary is provided, which stores grammar information including a conjunction relationship between character strings disposed adjacent to each other, determined by part of speech of the character strings, and the candidate character string extracting portion extracts character strings, which may come next to the latest selected character string, as candidate character strings, based on the part of speech information read from the character string dictionary and the grammar information stored in the grammar dictionary. Therefore, a list of candidate character strings to be displayed next on the display screen is determined based on grammar knowledge in the process of a sentence input operation. For example, in the case where the latest selected character string refers to the attributive form of a word with declined or conjugated endings, the substantives are preferentially displayed as candidate character strings, so that the intended character strings can be searched at a high speed.

In one embodiment, the candidate character string extracting portion includes appearance frequency updating means for updating an appearance frequency of each character string in the character string dictionary, based on a selection determining signal from the selecting means, and preferentially extracts character strings having large appearance frequencies as candidate character strings from the character string dictionary, considering that larger appearance frequencies correspond to higher extraction priorities. Therefore, a list of candidate character strings listed on the display screen can have a high hit rate (i.e., a high possibility of containing the intended character string), and the intended character string can be searched at a high speed.

In one embodiment, the character string dictionary and the candidate character string extracting portion are provided in a tabletop character input apparatus body, and the operation input unit, the display means and the display control means are provided in a portable terminal portion separated from the character input apparatus body. Therefore, the tabletop apparatus body having high processing ability will have a burdensome processing function of extracting a list of caudal character strings from the character string dictionary. For example, in the case where the portable terminal portion which performs input does not have sufficient processing ability, a display function is separated from a processing function by using data communication through a wired channel or a radio channel, whereby transportability of the portable terminal portion provided with the operation input portion and the display means can be prevented from being impaired.

In one embodiment, the character string dictionary includes dictionary information as a language dictionary which stores information on a meaning of each character string, as well as each of the character strings, the display means forms a window for displaying a meaning on the display screen, based on the meaning display instructing signal from the operation input unit, and the display control means displays information of a meaning of a corresponding character string in the window for displaying a meaning formed on the display screen, based on the meaning display instructing signal. Therefore, a meaning of a selected character string or meanings of listed candidate character strings from which a character string is selected can be confirmed in the process of a sentence input operation.

In one embodiment, a language of character strings to be input is Japanese or Chinese, a plurality of character strings are stored in an order based on a pronunciation thereof in the character string dictionary, and homonymous character strings are stored in an order based on the number of strokes (in a Chinese character) of a first character included in each of the character strings. Therefore, for example, in the case where the number of homonymous character strings displayed as candidate character strings on the display screen is larger than the number which can be displayed on the display screen, candidate character strings are displayed on the display screen by being arranged in the up and down direction and in the right and left direction based on the number of strokes of a first character in order of decreasing appearance frequency. Thus, even in the case where the number of homonymous character strings is larger than the number which can be displayed, a user can search the intended character string, based on the second ordering element such as the number of strokes as well as Japanese phonetic characters.

BRIEF DESCRIPTION OF THE DRAWINGS

FIG. 3 shows a part of character strings in a character string dictionary in the general-purpose character input apparatus of Embodiment 1 and information regarding the character strings.

FIG. 4 is a diagram illustrating input manipulation and operation in the general-purpose character input apparatus of Embodiment 1, showing a display example of candidate character strings at the initial state to be displayed in a candidate character string display region on a display screen.

FIG. 5 is a diagram illustrating input manipulation and operation in the general-purpose character input apparatus of Embodiment 1, showing a state on a display screen when the character string "I" is input.

FIG. 6 is a diagram illustrating input manipulation and operation in the general-purpose character input apparatus of Embodiment 1, showing a state on a display screen when the character strings "I will" are input.

FIG. 7 is a diagram illustrating input manipulation and operation in the general-purpose character input apparatus of Embodiment 1, showing a state on a display screen when character strings "I will take" are input.

FIG. 9 is a diagram illustrating input manipulation and operation in the general-purpose character input apparatus of Embodiment 1, showing a display state after enlargement processing in FIG. 8B.

FIG. 10 is a diagram illustrating input manipulation and operation in the general-purpose character input apparatus of Embodiment 1, showing a state on a display screen when the character strings "I will take a day" are input.

FIG. 11 is a diagram illustrating input manipulation and operation in the general-purpose character input apparatus of Embodiment 1, showing a state on a display screen when the character strings "I will take a day off" are input.

FIG. 12 is a diagram illustrating input manipulation and operation in the general-purpose character input apparatus of Embodiment 1, showing a state on a display screen when the character strings "I will take a day off tomorrow" are input.

FIG. 17 shows a stored state of character strings in a character string dictionary in the portable information communication apparatus of Embodiment 4 and information regarding the character strings.

FIG. 22 illustrates a method for storing a document created by the portable information communication apparatus of Embodiment 4 on a floppy disk.

BEST MODE FOR CARRYING OUT THE INVENTION

Hereinafter, the present invention will be described by way of illustrative embodiments.

EMBODIMENT 1

Figure 1A:
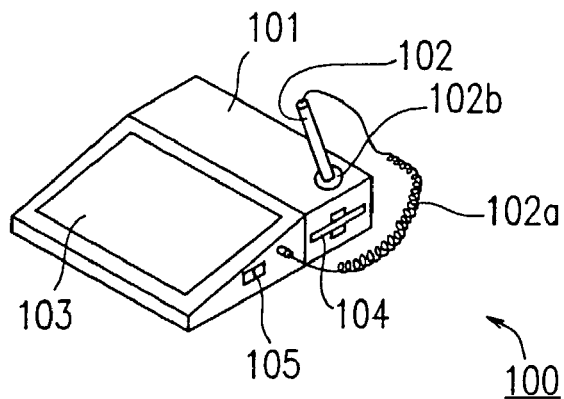
FIG. 1A shows an external appearance of a general-purpose character input apparatus of Embodiment 1 of the present invention.
Figure 1B:
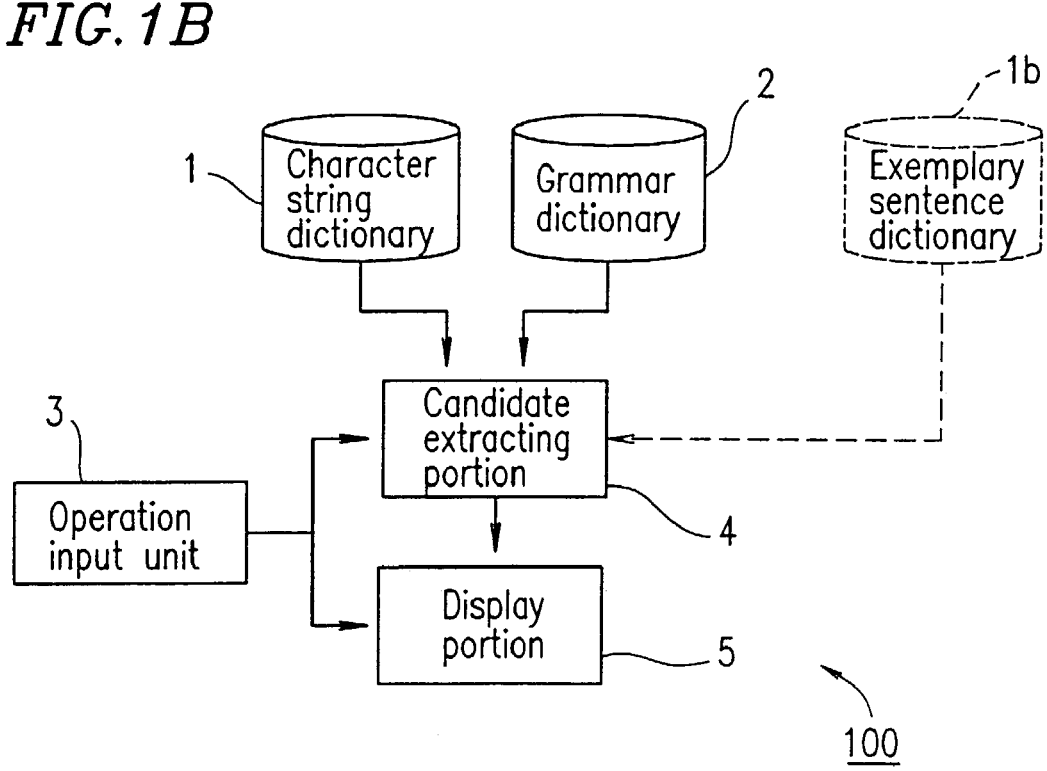
FIG. 1B shows a configuration of the general-purpose character input apparatus by using divided function blocks.
Figure 2:
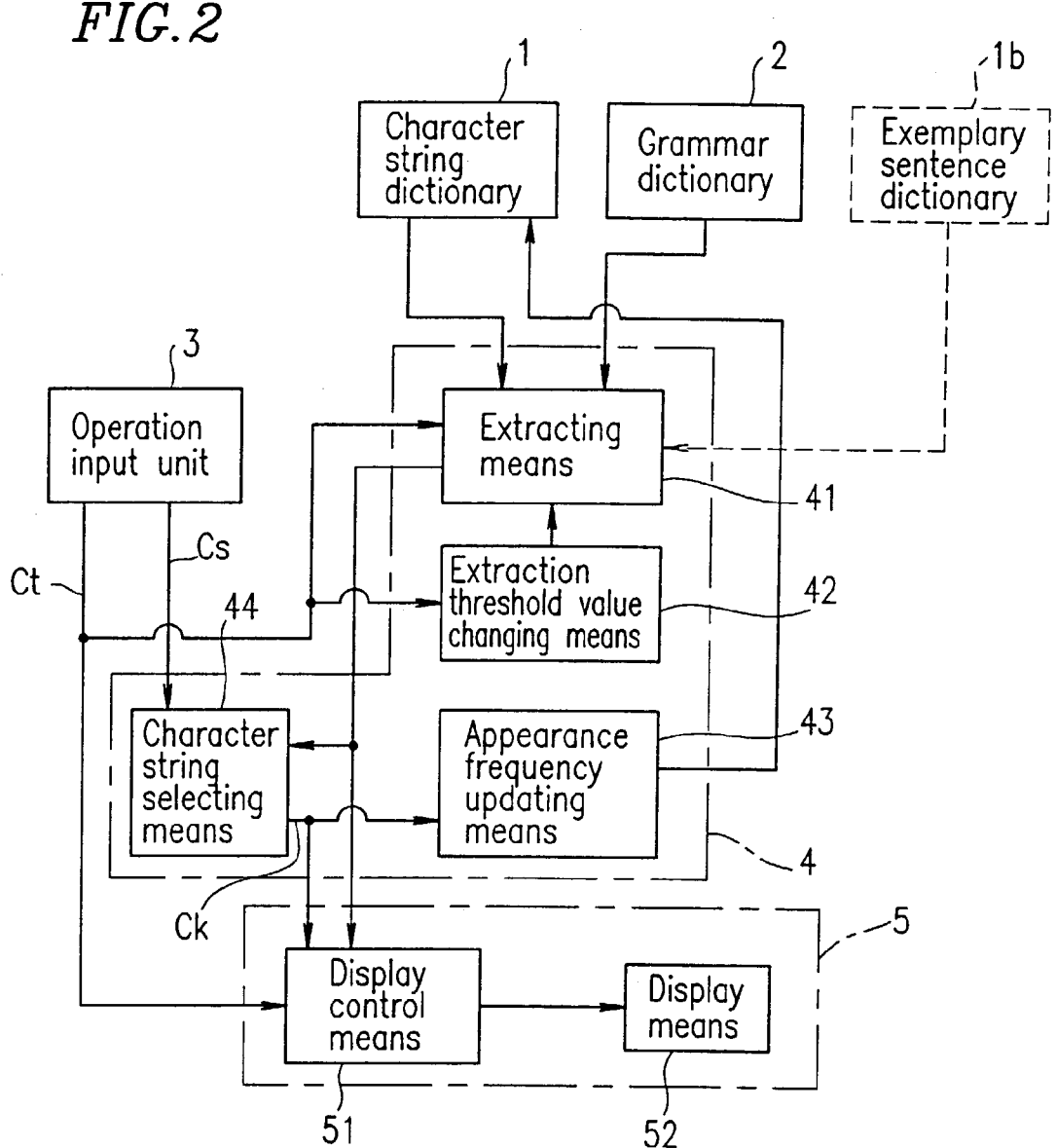
FIG. 2 is a block diagram showing a detailed configuration of the general-purpose character input apparatus of Embodiment 1.

FIGS. 1A and 1B are diagrams illustrating a character input apparatus in Embodiment 1 of the present invention, FIG. 1A is a diagram showing an external appearance thereof, and FIG. 1B shows the character input apparatus by divided function blocks. Furthermore, FIG. 2 is a block diagram showing a detailed structure of the character input apparatus.

In these Figures, reference numeral 100 denotes a character input apparatus of Embodiment 1, which has an apparatus body 101 for performing input processing of character strings and a display of character strings and an input pen 102 connected to the apparatus body 101 through a cable 102a, used for an operation such as input of character strings. Furthermore, a display portion 5 for performing an image display by liquid crystal or the like is mounted on the apparatus body 101, and a display screen 103 of the display portion 5 is integrally formed with a transparent touch-panel (tablet) for performing input of information by using the input pen 102. The apparatus body 101 is provided with an insert slot 104 for floppy disks and a pen holder portion 102b for holding the input pen 102. A power supply switch 105 is provided on a side of the apparatus body 101.

Furthermore, the character input apparatus 100 in Embodiment 1 includes a character string dictionary 1 in which a number of character strings consisting of at least one character and having a predetermined meaning are stored in a predetermined storage order, a grammar dictionary 2 in which grammar information containing a conjunction relationship determined by each part of speech of character strings disposed adjacent to each other in language used for inputting the character strings (herein, English), and an operation input unit 3 for generating various instructing signals in accordance with an operation by an operator, wherein a character string in the character string dictionary 1 is selected based on the instructing signal and grammar information to be input.

The character input apparatus 100 includes display means 52 having the display screen 103 for displaying the selected character string and candidate character strings for selection, a candidate character string extracting portion 4 for selecting a predetermined character string from a number of listed candidate character strings based on a selection instructing signal generated by an operation of the operation input unit 3 and extracting character strings from all the character strings stored in the character string dictionary 1 based on an operation signal generated by an operation of the operation input unit 3, and display control means 51 for controlling the display means 52 in such a manner that the candidate character strings extracted from the candidate character string extracting portion 4 are listed on the display screen 103 and the selected character strings are displayed thereon.

Herein, the display portion 5 is composed of a liquid crystal display as the display means 52 and the display control means 51. Furthermore, the candidate character string extracting portion 4 includes extraction threshold value changing means 42 for continuously changing an extraction threshold value of a character string based on a threshold value change instructing signal Ct generated by an operation of the operation input unit 3, extraction means 41 for extracting a character string from all the character strings stored in the character string dictionary as the candidate character string, based on a relationship between the extraction priority and the extraction threshold value and the grammar information, character string selecting means 44 for selecting a predetermined character string from a plurality of listed candidate character strings, based on the selection instructing signal Cs generated by an operation of the operation input unit 3, and appearance frequency updating means 43 for updating an appearance frequency of each character string in the character string dictionary 1 based on a selection determination signal Ck from the character string selecting means 44.

In the character input apparatus 100, the operation input unit 3 includes the input pen 102 as a position specifying member for specifying a position on a two-dimensional coordinate system corresponding to the display screen 103 and a touch-panel integrally formed with the display screen 103, wherein the threshold value change instructing signal Ct is generated by an operation of the input pen 102 on the touch-panel. Furthermore, the display control means 51 controls the display means 52 in such a manner that, in regions on the upper and lower sides of a position specified by the position specifying member on the display screen 103, the listed candidate character strings are shifted in an opposite direction to each other with respect to the specified position, when the number of the candidate character strings is increased or decreased in accordance with a change in the extraction threshold value. Herein, each of the above-mentioned means 41 to 44 and 51 is constructed in a CPU (central processing unit) and a peripheral apparatus, and each of the above-mentioned dictionaries 1 and 2 are constructed in a storage device such as a hard disk.

Hereinafter, the character input apparatus 100 of Embodiment 1 will be described in detail.

As shown in FIG. 3, the character string dictionary 1 is composed of a database storing character strings which appear in general sentences, such as words, phrases and sentences, together with appearance frequencies and part of speech information, wherein each character string is stored in an alphabetical order. In Embodiment 1, the character string dictionary 1 stores spellings of words of character strings and part of speech information. More specifically, the character string dictionary 1 stores about 57,000 character strings as registered words (hereinafter, which may also be referred to as "words"), together with part of speech information regarding each registered word (i.e., classification of a verb, an adjective, a noun, etc.: regarding verbs, classification of the present tense, the past tense, a past participle, etc.: regarding nouns, classification of the singular form and the plural form).

Furthermore, the registered words are classified into 32 stages with 1 representing the lowest appearance frequency in general sentences, and the appearance frequencies of respective registered words are registered as integers of 1 to 32. Furthermore, each registered word is successively assigned a numerical value (a serial number) representing the position of the registered word in an alphabetical order.

The display screen 103 of the display means (liquid crystal display) 52 has a display space corresponding to 15 lines×30 characters, as shown in FIG. 4. A display region of 4 lines on the upper side is a selection character string display region 52*a* in which a sentence is being input is displayed, and a display region of 11 lines on the lower side is a candidate character string display region 52*b* in which 10 registered words extracted from the character string dictionary 1 by the candidate character string extracting portion 4 are listed. In the candidate character string display region 52*b*, registered words whose appearance frequencies are equal to or more than an extraction threshold value at that moment are extracted from the character string dictionary 1 to be displayed. In the case where the number of extracted candidate character strings exceeds the number (10) of character strings which can be displayed, the display screen is scrolled in the candidate character string display region 52*b*, whereby candidate character strings which do not appear on the display screen 103 can be seen.

Furthermore, in the present embodiment, when the position in the candidate character string display region 52*b* specified by a pointing device, i.e., the input pen 102 is moved to the left, the above-mentioned extraction threshold value increases. This results in an increase in each interval of registered numbers of candidate character strings to be extracted, decreasing the number of candidate character strings which can be displayed. On the other hand, when the position in the candidate character string display region 52*b* specified by the input pen 102 is moved to the right, the extraction threshold value decreases. This results in a decrease in each interval of registered numbers of candidate character strings to be extracted, increasing the number of candidate character strings which can be displayed. When the extraction threshold value is set at 1, all the registered words can be displayed in the candidate character string display region 52*b* in a storage order.

When a specified position is moved to the right in the candidate character string display region 52*b*, and each extraction interval of candidate character strings is decreased, words having a low appearance frequency are gradually displayed with respect to the specified position. In this case, the word closest to the specified position gradually moves to the center of the candidate character string display region 52*b*. Due to such a display operation of candidate character strings, while watching a list which displays candidate character strings scrolling on the display screen 103 which is a limited 2-dimensional region, all the registered words can be searched.

Furthermore, in the present embodiment, the candidate character string closest to the specified position is displayed. When the touch-panel detects no pressure by the input pen 102, the candidate character string which is displayed is selected and added to a sentence consisting of character strings displayed in the selection character string display region 52*a* which are being input.

Next, an operation of the character input apparatus 100 will be described.

Herein, manipulation and operation of the character input apparatus 100 will be described, using an example of input of the sentence "I will take a day off tomorrow."

First, selection of the first word "I" will be described with reference to FIGS. 4 to 12.

When the character input apparatus 100 is turned on by the power supply switch 105, the candidate character string extracting portion 4 selects an article, a pronoun, a noun, an auxiliary verb, an interrogative, or the like as a part of speech which may come at the beginning of a sentence, by referring to the grammar dictionary 2, and extracts a part of speech and predetermined character strings (i.e., character strings having an appearance frequency higher than an initially set extraction threshold value) from all the character strings (i.e., the above-mentioned registered words) stored in the character string dictionary 1. In this case, the character strings are extracted as candidate character strings in order of appearance frequency by the number (10) which can be displayed in the candidate character string display region 52b of the display screen 103. The extracted candidate character strings are displayed in the candidate character string display region 52b of the display screen 103 by the display control means 52, as shown in FIG. 4. At this time, only a cursor 103a which represents an input position of a character string is displayed in the selection character string display region 52a. In FIG. 4, for reference, part of speech information and appearance frequencies regarding each character string are shown. However, only registered words are actually displayed on the display screen 103.

In this state, a user presses the touch-panel (i.e., the display screen 103) with the input pen 102, thereby specifying coordinates in the candidate character string display region 52b, and moves the input pen 102 so that the registered word "I" is displayed. Thereafter, the user removes the input pen 102 from the display screen 103 to select the registered word "I", and as shown in FIG. 5, the word "I" is displayed in the selection character string display region 52a of the display screen 103. When one word is selected, 10 candidate character strings which are highly likely to come next grammatically and have a high appearance frequency are displayed in the candidate character string display region 52b. In this case, an element forming a subject is obtained, so that the candidate character string extracting portion 4 extracts candidate character strings based on appearance frequencies under the condition that a certain value is added to each appearance frequency of an auxiliary verb and a verb which are likely to come next, by referring to the grammar dictionary 2.

Similarly, the user presses the touch-panel (i.e., the display screen 103) with the input pen 102 in order to select the next word "will", thereby specifying coordinates in the candidate character string display region 52b. The user moves the input pen 102 so that the registered word "will" is displayed, and removes the input pen 102 from the display screen 103. Thus, the registered word "will" is selected, and as shown in FIG. 6, the phrase "I will" is displayed in the selection character string display region 52a of the display screen 103. In this case, an auxiliary verb is selected, so that the candidate character string extracting portion 4 extracts candidate character strings based on appearance frequencies under the condition that a certain value is added to an appearance frequency of the original form of a verb which is likely to come next, by referring to the grammar dictionary 2, and 10 candidate character strings are displayed in the candidate character string display region 52b are displayed.

Subsequently, the user presses the touch-panel (i.e., the display screen 103) with the input pen 102 in order to select the next word "take", thereby specifying coordinates in the candidate character string display region 52b. The user moves the input pen 102 so that the registered word "take" is displayed, and removes the input pen 102 from the display screen 103. Thus, the registered word "take" is selected, and as shown in FIG. 7, the phrase "I will take" is displayed in the selection character string display region 52a of the display screen 103. In this case, a verb is selected, so that the candidate character string extracting portion 4 extracts candidate character strings based on appearance frequencies under the condition that a certain value is added to the appearance frequencies of a preposition which may be put after the word "take" and an article and a noun which are likely to come next, by referring to the grammar dictionary 2, and 10 candidate character strings are displayed in the candidate character string display region 52b.

Figures 8A, 8B:
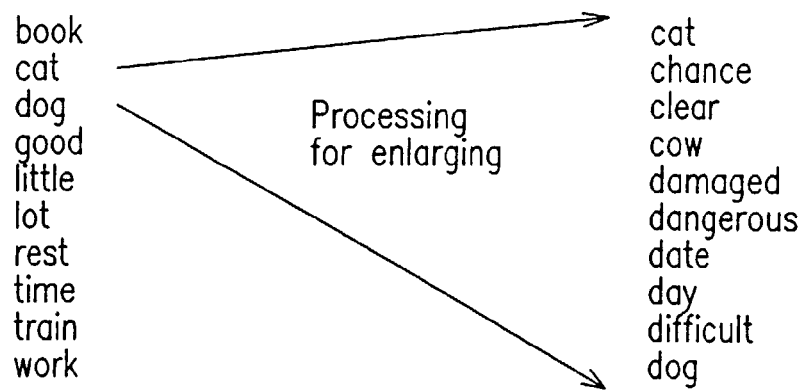
FIG. 8A shows a state on a display screen when the character strings "I will take a" are input in the general-purpose character input apparatus of Embodiment 1.
FIG. 8B shows processing for enlarging a range of candidate character strings to be selected.

Subsequently, the user presses the touch-panel (i.e., the display screen 103) with the input pen 102 in order to select the next word "a", thereby specifying coordinates in the candidate character string display region 52b. The user moves the input pen 102 so that the registered word "a" is displayed, and removes the input pen 102 from the display screen 103. Thus, the registered word "a" is selected, and as shown in FIG. 8A, the phrase "I will take a" is displayed in the selection character string display region 52a of the display screen 103. In this case, an indefinite article is selected, so that the candidate character string extracting portion 4 extracts candidate character strings based on appearance frequencies under the condition that a certain value is added to the appearance frequencies of an adjective and a noun which may be put after the word "a", by referring to the grammar dictionary 2, and 10 candidate character strings are displayed in the candidate character string display region 52b.

Subsequently, the user must select the next word "day". The user presses the touch-panel (i.e., the display screen 103) with the input pen 102 in the state shown in FIG. 8A, thereby specifying coordinates in the candidate character string display region 52b. The user moves the input pen 102 in such a manner that a gap between the registered words "cat" and "dog" is enlarged (i.e., in such a manner that each extraction interval of the registered words disposed between the registered words "cat" and "dog" becomes smaller), the content of the list of the registered words changes as shown in FIG. 8B. FIG. 9 shows the content of the list of the registered words after change.

More specifically, in Embodiment 1, the user specifies a position close to the left end of the candidate character string display region 52b and between the displayed words "cat" and "dog" with the input pen 102, and continuously presses the input pen 102 on the display screen 103 so as to specify the position between the displayed words "cat" and "dog" in the up and down direction and moves the input pen 102 to the right while pressing the screen with the input pen 102. Due to this input operation, an extraction threshold value is gradually decreased by the changing means 42, and words with a low appearance frequency come to be gradually displayed with respect to the specified position. As a result, for example, even the registered words with an appearance frequency of 23 are displayed as candidate character strings, and the list of candidate character strings in FIG. 9 will include the intended registered word "day".

Subsequently, the user presses the touch-panel (i.e., the display screen 103) with the input pen 102 in order to select the next word "day", thereby specifying coordinates in the candidate character string display region 52b. The user moves the input pen 102 so that the registered word "day" is displayed, and removes the input pen 102 from the display screen 103. Thus, the registered word "day" is selected, and as shown in FIG. 10, the phrase "I will take a day" is displayed in the selection character string display region 52a of the display screen 103. In this case, a noun is selected, so that the candidate character string extracting portion 4 extracts candidate character strings based on appearance frequencies under the condition that a certain value is added to the appearance frequencies of a preposition and an infinitive which may be put after the word "day", by referring to the grammar dictionary 2, and 10 candidate character strings are displayed in the candidate character string display region 52b.

Subsequently, the user presses the touch-panel (i.e., the display screen 103) with the input pen 102 in order to select the next word "off", thereby specifying coordinates in the candidate character string display region 52b. The user moves the input pen 102 so that the registered word "off" is displayed, and removes the input pen 102 from the display screen 103. Thus, the registered word "off" is selected, and as shown in FIG. 11, the sentence "I will take a day off" is displayed in the selection character string display region 52a of the display screen 103. In this case, the word "off" is selected, so that the candidate character string extracting portion 4 recognizes "day off" as an expression, and extracts candidate character strings based on appearance frequencies under the condition that a certain value is added to the appearance frequencies of a preposition and a noun representing a time which may be put after the word "off", by referring to the grammar dictionary 2, and 10 candidate character strings are displayed in the candidate character string display region 52b.

Subsequently, the user presses the touch-panel (i.e., the display screen 103) with the input pen 102 in order to select the next word "tomorrow", thereby specifying coordinates in the candidate character string display region 52b. The user moves the input pen 102 so that the registered word "tomorrow" is displayed, and removes the input pen 102 from the display screen 103. Thus, the registered word "tomorrow" is selected, and as shown in FIG. 12, the sentence "I will take a day off tomorrow" is displayed in the selection character string display region 52a of the display screen 103. In this case, a noun representing a time is selected, so that the candidate character string extracting portion 4 extracts candidate character strings based on appearance frequencies under the condition that a certain value is added to the appearance frequencies of a noun representing a shorter time which may be put after the word "tomorrow", by referring to the grammar dictionary 2, and 10 candidate character strings are displayed in the candidate character string display region 52b.

At this time, in Embodiment 1, the candidate character string extracting portion 4 refers to the grammar dictionary 2 to determine that the sentence should be now completed. Therefore, "." with a high appearance frequency is prepared for the end of the dictionary. As shown in FIG. 12, "." is displayed at the end of 10 candidate character strings in the candidate character string display region 52b. The user can select a punctuation mark through a similar procedure, thereby completing the sentence. At this time, the candidate character string display region 52b displays the same initial registered words as those in FIG. 4.

In the above-mentioned operation, the amount of up and down scroll of character strings on the display screen, corresponding to the amount of movement of the input pen 102 and the number of stages of the appearance frequencies may be appropriately determined depending upon the experiment.

As described above, in the character input apparatus in the present embodiment, a position on the two-dimensional display screen specified by the input pen 102 and the tablet 103 is changed by using the input pen 102, whereby appropriate candidate character strings are selected from the list of character strings forming a word, a phrase, and a sentence which dynamically change, and a sentence is input. Therefore, unlike the input of characters by using a keyboard, there is no dependence on language in an input operation.

Furthermore, by using a predetermined algorithm, a group of character strings with a high appearance frequency are extracted as candidates to be input after a selected character string, and listed on the display screen 103. When there is no intended character string, a parameter (an extraction threshold value) of an extraction algorithm is successively and repeatedly changed so that the display list of character strings on the display screen 103 comes closer to that including the intended character string. Therefore, the intended character string can be searched at a high speed.

Furthermore, when the intended character string is displayed as a candidate character string on the display screen 103, this character string can be selected by an input operation, and connected to an incomplete sentence.

Furthermore, since the list of registered words to be displayed is extracted based on a grammar knowledge in the process of inputting a sentence, the registered words can be extracted at a high speed.

Furthermore, the list of registered words to be displayed is extracted with reference to a statistically obtained appearance frequency of each registered word. Therefore, there is a high probability that the intended registered word will be included in the list of registered words to be displayed. Thus, the registered words can be searched at a high speed.

Furthermore, the appearance frequency updating means 43 statistically reflects a history such as the number of user's selections on an appearance frequency used for extracting each candidate character string. Therefore, the character input apparatus 100 learns an appearance frequency of each character string to improve a search efficiency, whereby the intended registered word can be searched at a high speed.

In Embodiment 1, the meaning of each character string is not stored in the character string dictionary. However, it may also be possible that dictionary information is added to the character string dictionary as a language dictionary, and a window for displaying a meaning (not shown) is temporarily created, for example, on the right side of the candidate character string display region 52b of the display screen 103 with an operation by a user such as double clicking a mouse or by a two-times continuous pressing operation in the case of the input pen 102, so that the meaning of a specified registered word is displayed therein.

More specifically, a meaning display instructing signal is output from the operation input unit 3 by a two-times continuous pressing operation with the input pen 102. The display means which receives this signal temporarily creates a window for displaying a meaning on the right side of the candidate character string display region 52b of the display screen 103. At this time, the display control means 51 receives the meaning display instructing signal from the operation input unit 3, and based on this signal, controls the display means so that the meaning information of the corresponding character string is displayed in the window for displaying a meaning on the display screen 103.

With the above-mentioned structure, a meaning of a registered word (character string) to be used in the process of writing a sentence can be confirmed.

Furthermore, in Embodiment 1, input of symbols has not been mentioned. For example, the symbol "!" may be stored in the character string dictionary 1 by assigning the spelling "exclamation" to the symbol "!" or by adding the symbol "!" itself to the end of the character string dictionary.

Furthermore, as represented by broken lines in FIGS. 1B and 2, an exemplary sentence dictionary 1*b* storing a word which is placed at the beginning of a sentence and the corresponding formulated phrases to be put after the word may be provided; and the extraction means 41 may be designed to extract the corresponding formulated phrases when a selected character string which is placed at the beginning of a sentence is either of the registered words in the exemplary sentence dictionary 1*b*, whereby these sentences are preferentially listed in the candidate character string display region 52*b*.

Furthermore, in Embodiment 1, a character string in the candidate character string display region 52*b* is determined and added to a character string which is being displayed in the selection character string display region 52*a* by removing the input pen 102 from the touch-panel (display screen) 103. However, the function of selecting a character sting from the character string dictionary 1 in the candidate character string display region 52*b* and adding the selected character string to a character string which is being displayed in the selection character string display region 52*a* may be placed as a button on the touch-panel (display screen) 103, thereby enabling the input pen 102 to be pressed against the touch-panel 52 a plurality of times, allowing the movement of the input pen 102 in the up and down directions on the touch-panel (display screen) 103 to correspond to scrolling in the up and down direction of candidates which are being displayed in the candidate character string display region 52*b*, and allowing the movement of the input pen 102 in the right and left directions to correspond to the increase and decrease in an extraction threshold value in the same way as in Embodiment 1.

EMBODIMENT 2

Figure 13A:
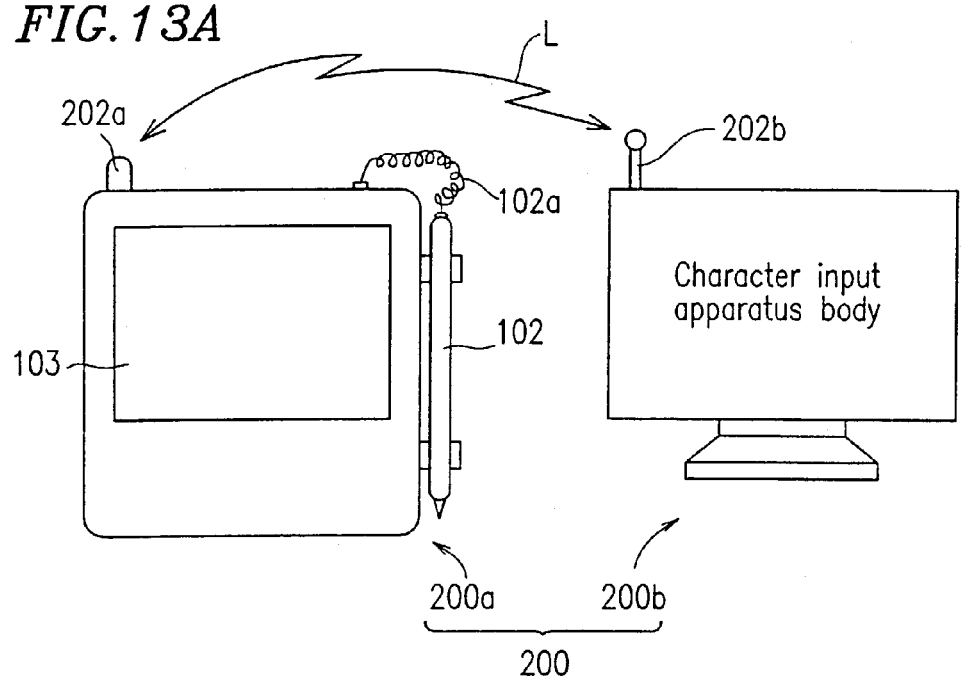
FIG. 13A is a conceptual diagram showing an entire structure of a character input apparatus in which a processing function of Embodiment 2 of the present invention is separated.
Figure 13B:
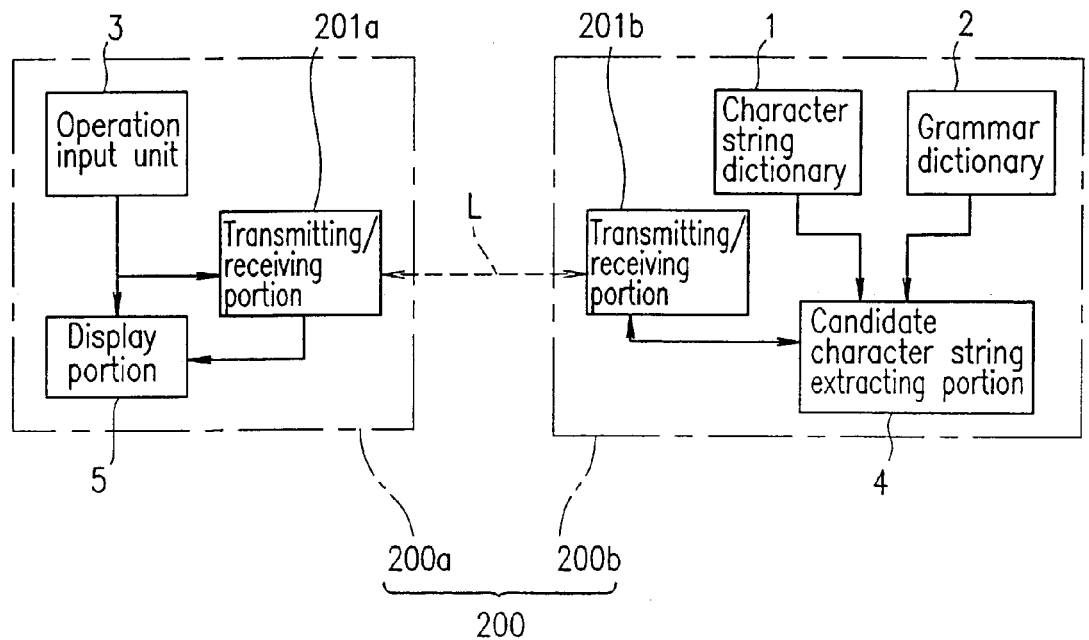
FIG. 13B shows the character input apparatus by using divided function blocks.

FIGS. 13A and 13B are diagrams illustrating a character input apparatus in Embodiment 2 of the present invention. FIG. 13A is a conceptual diagram showing the entire structure of the apparatus, and FIG. 13B shows the character input apparatus by using divided function blocks. In these Figures, the reference numerals identical with those in FIG. 1 denote the elements or equivalents identical with those in Embodiment 1.

In the Figures, reference numeral 200 denotes a character input apparatus in Embodiment 2, which is composed of a tabletop character input apparatus body portion 200*b* and a portable terminal portion 200*a* separated from the character input apparatus body portion 200*b*.

The character input apparatus body portion 200*b* is provided with a character string dictionary 1, a grammar dictionary 2 and a candidate character string extracting portion 4 which have the same structures as those in the character input apparatus 100 in Embodiment 1. The portable terminal portion 200*a* is provided with an operation input unit 3 and a display portion 5 which have the same structures as those in the character input apparatus 100 in Embodiment 1. Furthermore, the character input apparatus body portion 200*b* and the portable terminal portion 200*a* have transmitting/receiving portions 201*b* and 201*a* and antennas 202*a* and 202*b* for transmitting and receiving data through a radio channel L. The transmitting/receiving portions 201*b* and 201*a* can alternatively have a structure in which data is transmitted/received through a wired channel.

In the character input apparatus 200, an operation signal generated by an operation of a position specifying member (i.e., an input pen) 102 in the operation input unit 3 of the portable terminal portion 200*a* is transmitted to the character input apparatus body portion 200*b* through the radio channel L as position specifying data which represents a specified position on the display screen 103 in the portable terminal portion 200*a*. Then, in the character input apparatus body portion 200*b*, the position specifying data is received by the transmitting/receiving portion 201*b* to be supplied to extracting means 41 and extraction threshold value changing means 42 (see FIG. 2).

Furthermore, when a selection instructing signal generated by an operation in the operation input unit 3 is transmitted from the portable terminal portion 200*a* to the character input apparatus body portion 200*b* through the radio channel L, in the character input apparatus body portion 200*b*, the selection instructing signal is received by the transmitting/receiving portion 201*b* to be supplied to the character string selecting means 44 (see FIG. 2) in the candidate character string extracting portion 4.

Furthermore, when extraction candidate character string data regarding candidate character strings extracted by the candidate character string extracting portion 4 in the character input apparatus body portion 200*b* is transmitted to the portable terminal portion 200*a* through the radio channel L, in the portable terminal portion 200*a*, the extraction candidate character string data is received by the transmitting/receiving portion 201*a* to be supplied to display control means 51 (see FIG. 2) in the display portion 5.

Furthermore, when selection character string data regarding a character string selected by the selecting means 41 in the candidate character string extracting portion 4 is transmitted to the portable terminal portion 200*a* through the radio channel L, in the portable terminal portion 200*a*, the selection character string data is received by the transmitting/receiving portion 201*a* to be supplied to display control means 51 (see FIG. 2) in the display portion 5.

A character input operation and operations accompanying the character input operation are the same as those in Embodiment 1.

In the character input apparatus 200 of Embodiment 2 with such a structure, a circuit portion for performing burdensome processing of extracting a list of candidate character strings from the character string dictionary 1 and a circuit portion for performing input and a display are separated by using a network such as the radio channel L, and only a circuit portion for performing input and a display is provided in the portable terminal portion 200*a*. Therefore, in addition to the effect of Embodiment 1, there is an effect that portability of the portable terminal portion 200*a* for performing a display and input will not be impaired.

EMBODIMENT 3

Figure 14A:
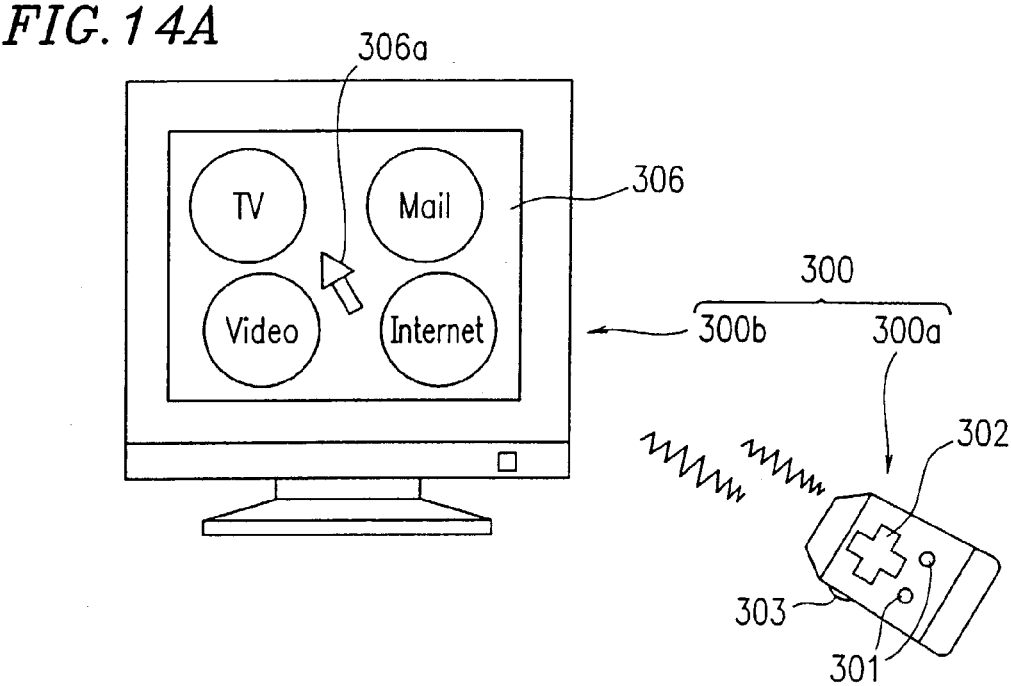
FIG. 14A is a conceptual diagram showing an entire structure of a network TV provided with a character input apparatus of Embodiment 3 of the present invention.
Figure 14B:
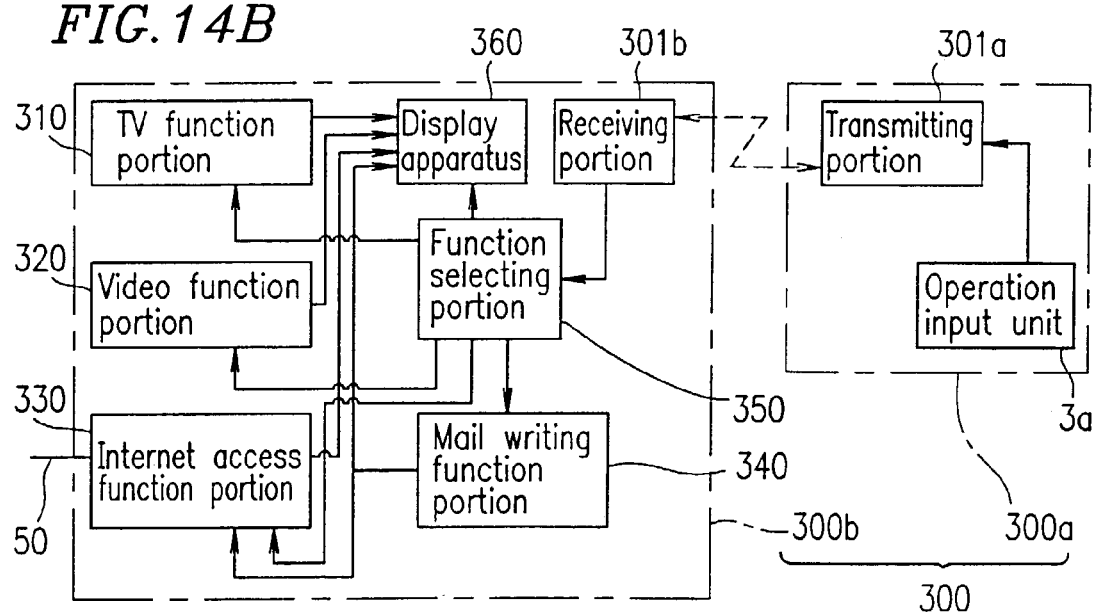
FIG. 14B shows the network TV by using divided function blocks.
Figure 14C:
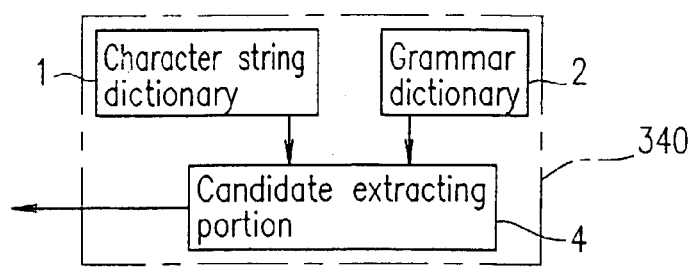
FIG. 14C is a block diagram illustrating a structure of a mail writing function portion of the network TV.

FIGS. 14A to 14C are diagrams illustrating a network TV system (hereinafter, abbreviated as a "network TV") as information equipment equipped with a character input apparatus of Embodiment 3 of the present invention. FIG. 14A is a conceptual diagram showing an entire structure of the network TV, FIG. 14B shows the network TV by divided function blocks, and FIG. 14C is a block diagram illustrating a structure of a mail writing function portion of the network TV.

In these Figures, reference numeral 300 denotes a multi-function network TV (hereinafter, also referred to as "information equipment") of Embodiment 3, which is composed of an information equipment body 300*b* and a remote control device (hereinafter, abbreviated as a "remote controller") 300*a* for remotely controlling the information equipment body 300*b* using infrared rays.

The remote controller 300a includes a power supply switch 303, operation buttons (corresponding to mouse buttons) 301, and a cross-pad 302. The remote controller 300a further includes an operation input unit 3a which generates a predetermined instructing signal by operating these elements, and an instructing signal generated by the operation input unit 3a is transmitted to the information equipment body 300b by a transmitting portion 301a.

The information equipment body 300b includes a TV function portion 310 for displaying an image by receiving a TV signal, a video function portion 320 for recording and reproducing a video tape, an internet access function portion 330 for access to the internet connected to a telephone line 50, a mail writing function portion 340 for writing a document for E-mail, a function selecting portion 350 for selecting each function portion in accordance with a control signal, and display means 360 for displaying an image based on a display signal from each function portion. An instructing signal from the remote controller 300a is received by a receiving portion 301b, and the instructing signal is supplied from the receiving portion 301b to each of the function portions 310, 320, 330, and 340 through the function selecting portion 350.

Furthermore, the information equipment 300 is designed to send E-mail written by the mail writing function portion 340 from the internet access function portion 330 through the telephone line 50, and to receive E-mail from outside at the internet access function portion 330 through the telephone line 50. Reference numeral 306 denotes a display screen which is part of the display apparatus 360.

The network TV 300 which is information equipment in Embodiment 3 includes a function of the character input apparatus 100 of Embodiment 1.

More specifically, as shown in FIG. 14C, the mail writing function portion 340 is provided with the character string dictionary 1, the grammar dictionary 2, and the candidate character string extracting portion 4 in the character input apparatus 100 in Embodiment 1, and a function corresponding to the display portion 5 of Embodiment 1 is provided by the display apparatus 360. Furthermore, the remote controller 300a is provided with the operation input unit 3a having a function corresponding to the operation input unit 3 of Embodiment 1. That is, a position specifying signal for moving a position indicating mark 306a on the display screen 306 can be generated by using one or more of the button switches 301 and the cross-pad 302 for operation.

In the network TV 300, when a position specifying signal and a predetermined operation signal generated by operation of one or more of the button switches 301 and the cross-pad 302 of the remote controller 300a are transmitted from the transmitting portion 301a of the remote controller to the information equipment body 300b, a position on the display screen 306 of the display apparatus 360 provided in the information equipment body 300b is specified based on the transmitted position specifying signal, and extraction and selection of a candidate character string by the candidate character string extracting portion are performed based on the transmitted operation signal.

In the network TV 300 with such a structure, when power is turned on, a selection menu of various functions is displayed on the display screen 306, as shown in FIG. 14A. A user can operate the cross-pad 302 of the remote controller 300a, while watching the selection menu, to move the position indicating mark 306a to a display portion of a desired function on the display screen 306, and press one or more of the button switches 301 to operate a desired function portion. More specifically, an operation signal generated by operation of the remote controller is transmitted from the transmitting portion 301a to the receiving portion 301b of the information equipment body 300b, and the function selecting portion 350 selects either of the function portions 310, 320, 330, and 340 in accordance with a signal from the receiving portion 301b.

For example, in the case of selecting the TV function portion 310, the information equipment 300 operates as an ordinary TV, whereby selection of a channel and adjustment of a volume can be performed by using the remote controller 300a. Furthermore, in the case of selecting the video function portion 320, a circuit portion corresponding to a video deck provided in the information equipment 300 operates, and operations with respect to an ordinary video deck (i.e., reproduction, recording, rewinding, fast-forwarding, pausing, etc.) can be performed by using the remote controller 300a. Furthermore, in the case of selecting the internet access function portion 330, access to the internet can be performed by the information equipment 300 in the same way as in an ordinary personal computer (hereinafter, abbreviated as a "PC").

In the case of selecting the mail writing function portion 340, the information equipment 300 functions as the character input apparatus in Embodiment 1, and a document can be written by the information equipment 300.

Manipulation and operation of character input in this case are substantially the same as that of the character input apparatus 100 of Embodiment 1. However, in the character input apparatus 100 of Embodiment 1, character strings are input by using the input pen 102 and the touch panel 103, while in Embodiment 3, character strings are input by using one or more of the button switches 301 and the cross-pad 302 of the remote controller 300a.

Briefly, for example, as shown in FIG. 8A, in the case where the registered word "day" is searched under the condition that candidate character strings are listed in the candidate character string display region 52b on the display screen 306, first, the position indicating mark 306a is moved to a region between the registered words "cat" and "dog" by using the cross-pad 302, and a right side portion of the cross-pad 302 is pressed while either of the button switches 301 is pressed down. Thus, in the same way as in the case where the input pen 102 is moved to the right while the input pen 102 is in contact with the touch panel 103 in the character input apparatus 100 in Embodiment 1, each extraction interval of the registered words disposed between the registered words "cat" and "dog" is decreased, and registered words can be newly displayed between the registered words "cat" and "dog" (see FIG. 8B).

Furthermore, in the network TV 300 of Embodiment 3, selection from the registered words displayed in the candidate character string display region 52b is performed by operating the remote controller 300a as follows. For example, as shown in FIG. 4, the position indicating mark 306a is moved to a display portion of the registered word "I" while candidate character strings are listed in the candidate character string display region 52b on the display screen 306. When the right side portion of the cross-pad 302 is pressed while one of the button switches 301 is pressed down under this condition, as shown in FIG. 5, the registered word "I" is selected, and a plurality of registered words which follow the registered word "I" are listed. Then, the position indicating mark 306a is moved to a display portion of the registered word "will". When the right side portion of the cross-pad 302 is pressed while one of the button switches 301 is pressed down under this condition, the registered word "will" is selected as shown in FIG. 6.

More specifically, in Embodiment 3, an operation of the cross-pad 302 under the condition that one of the button switches 301 is pressed down corresponds to a moving operation of the input pen 102 while keeping the input pen 102 in touch with the touch panel of Embodiment 1. Furthermore, pressing and releasing of one of the button switches 301 correspond to contacting the input pen 102 to the touch panel and removing the input pen 102 from the touch panel in Embodiment 1. By operating the remote controller 300a as described above, input processing of sentences can be performed in the network TV 300 in Embodiment 3.

Even when displayed candidates are scrolled in the up and down directions by pressing the upper side portion and the lower side portion of the cross-pad 302, an extraction interval of registered words is increased/decreased with respect to a candidate in the vicinity of a center of the candidate character string display region 52b by pressing the right side portion and the left side portion of the cross-pad 302, and the candidate at the center of the candidate character string display region 52b is selected by pressing one of the button switches 301, a sentence can be similarly input.

In Embodiment 3 with such a structure, the character input apparatus is provided in the network TV 300, and the operation input unit 3a is built in the remote controller 300a of the TV. Therefore, in addition to the effect in Embodiment 1, there is an effect that a document to be sent via E-mail by the network TV 300 can be easily and rapidly written by using the remote controller 300a.

EMBODIMENT 4

Figure 15A:
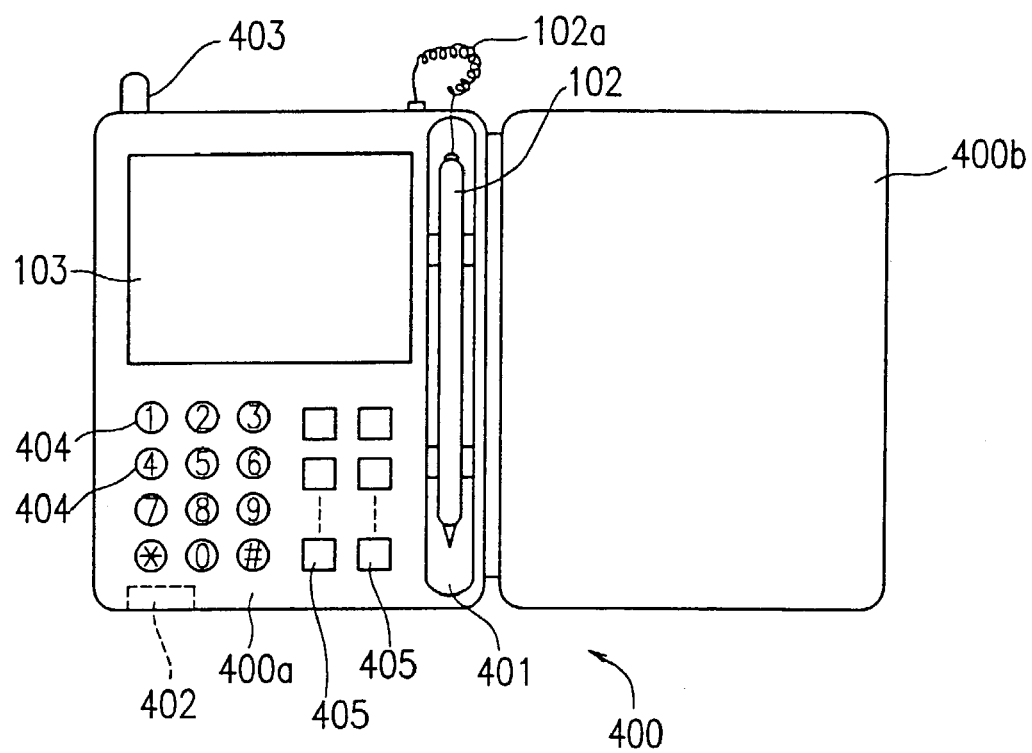
FIG. 15A shows an external appearance of a portable information communication apparatus of Embodiment 4 of the present invention.
Figure 15B:
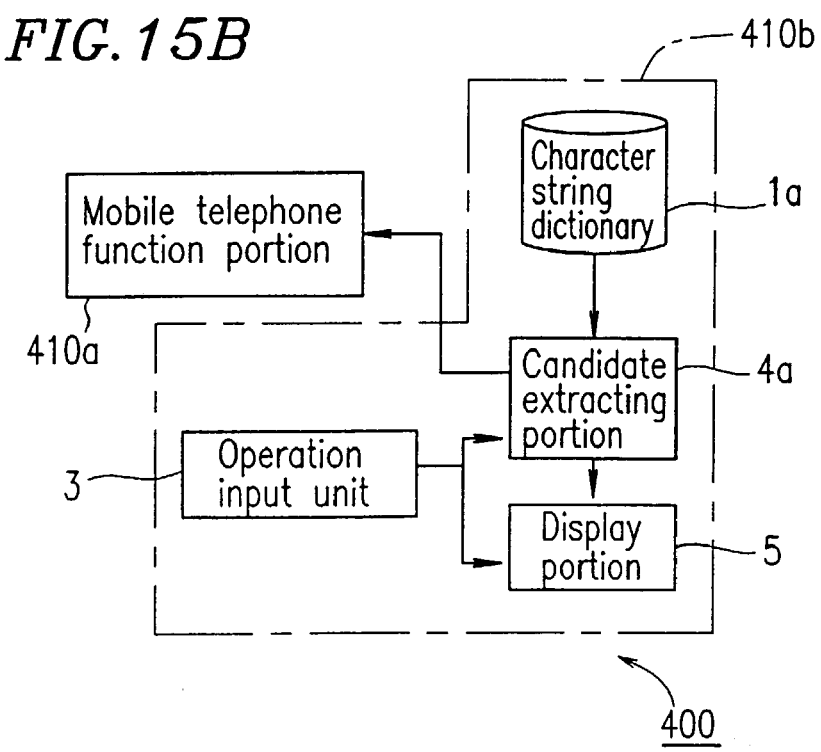
FIG. 15B shows the portable information communication apparatus by divided function blocks.
Figure 16:
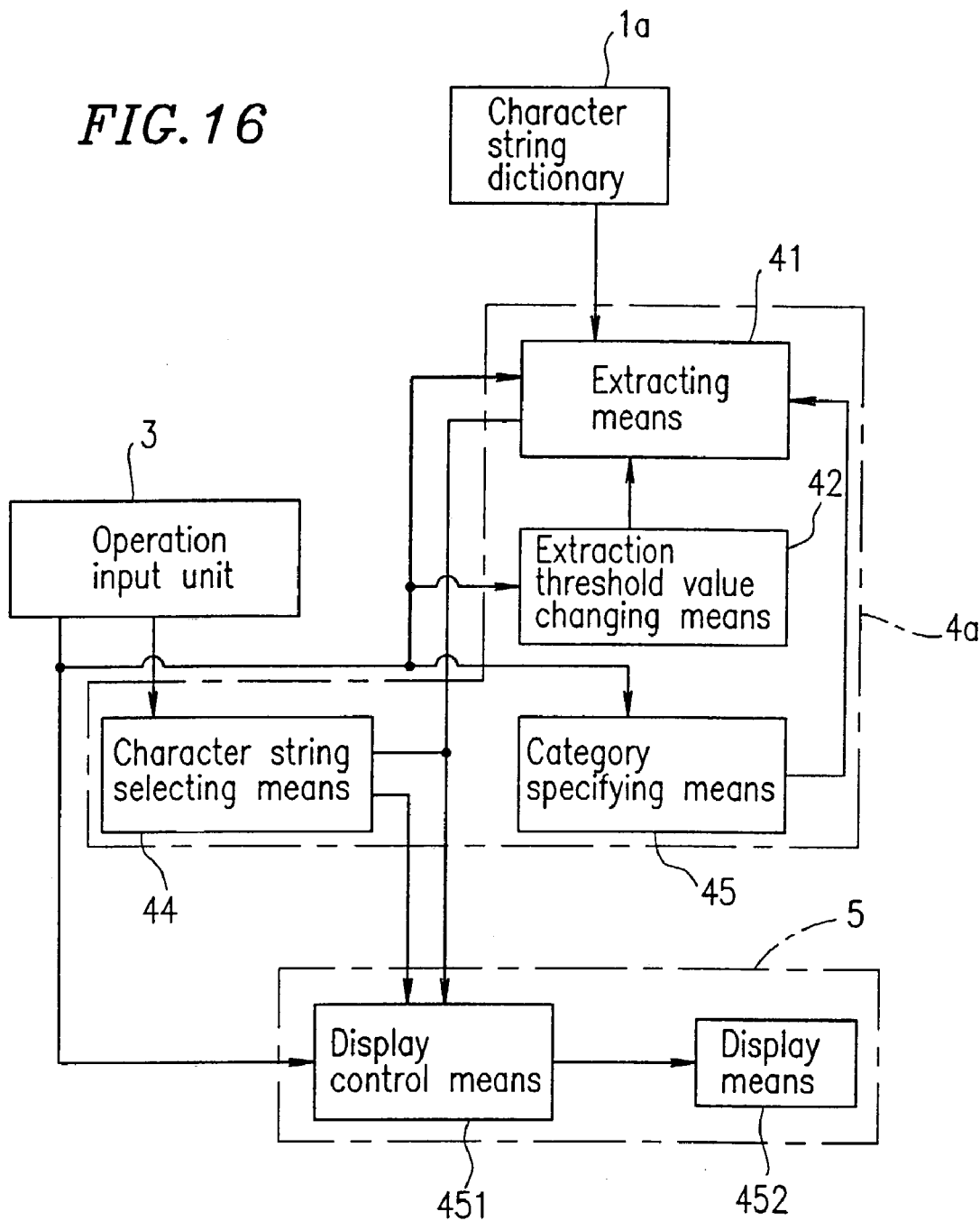
FIG. 16 is a block diagram showing a detailed structure of the portable information communication apparatus of Embodiment 4.

FIGS. 15A and 15B are diagrams illustrating a portable information communication apparatus of Embodiment 4 of the present invention. FIG. 15A is a diagram showing an external appearance of the apparatus, and FIG. 15B is a diagram showing the portable information communication apparatus by using divided function blocks. FIG. 16 is a block diagram showing a detailed structure of the portable information communication apparatus.

In these Figures, reference numeral 400 denotes a portable information communication apparatus in Embodiment 4. The portable information communication apparatus 400 has a handy character input function together with a mobile telephone. The handy character input function is obtained by simplifying the character input function in the character input apparatus 100 in Embodiment 1.

More specifically, the portable information communication apparatus 400 includes an apparatus body 400a which is provided with a mobile telephone function portion 410a for performing an operation as a usual mobile telephone and a character input function portion 410b for performing input processing and display of character strings, and a cover member 400b for protecting an operation surface is attached to the apparatus body 400a so as to be opened or closed. Reference numeral 402 denotes a socket for connection to other information equipment, reference numeral 403 denotes a transmitting/receiving antenna, reference numeral 404 denotes telephone dial buttons, and reference numeral 405 denotes button switches for operating a telephone.

The apparatus body 400a includes an input pen 102 used for an operation such as input of character strings, forming an operation input unit 3 of the character input function portion 410b. The input pen 102 is connected to the apparatus body 400a through a cable 102a, and can be accommodated in a pen holder portion 401 formed in the apparatus body 400a.

More specifically, the apparatus body 400a is provided with a liquid crystal panel (display means) 452 for performing an image display, using liquid crystal included in a display portion 5 of the character input function portion 410b and display control means 451 for controlling the liquid crystal panel 452. A display screen 103 of the liquid crystal panel is integrally formed with a transparent touch panel (tablet) for performing input of information, using the input pen 102. The touch panel forms the operation input unit 3.

The character input function portion 410b includes a character string dictionary 1a in which a number of character strings consisting of at least one character and having a predetermined meaning are stored in a predetermined storage order, and a candidate character string extracting portion 4a which selects a predetermined character string from a plurality of listed candidate character strings, based on a selection instructing signal generated by an operation in the operation input unit 3, and extracts a character string from all the character strings stored in the character string dictionary 1a, based on an operation signal generated by an operation in the operation input unit 3.

Herein, regarding each registered word (character string) stored in the character string dictionary 1a, appearance frequencies P1 to P8 corresponding to 8 categories: (Shopping), (Play), (Coming home), (Message), (Work), (Meeting someone), (Staying overnight), and (Eeating out) are set, and the character string dictionary 1a stores the appearance frequencies P1 to P8 together with each registered word, as shown in FIG. 17. Furthermore, the display control means 451 controls the display means 452 in such a manner that candidate character strings extracted by the candidate character string extracting portion 4a are listed and a character string selected by the candidate character string extracting portion 4a is displayed on the display screen 103. On the display screen 103 of the liquid crystal display 452 which is the above-mentioned display means, in a mode in which the character input function portion 410b is operated, a selection character string display region 452a for displaying an incomplete sentence and a candidate character string display region 452b for listing registered words extracted from the character string dictionary 1a by the candidate character string extracting portion 4a are set.

Furthermore, the candidate character string extracting portion 4a includes extraction threshold value changing means 42 for continuously changing an extraction threshold value of character strings, based on a threshold value change instructing signal generated by an operation in the operation input unit 3, extracting means 41 for extracting character strings from all the character strings stored in the character string dictionary as the candidate character strings, based on a large and small relationship between extraction priorities of the character strings and the extraction threshold value, character string selecting means 44 for selecting a predetermined character sting from a plurality of listed candidate character strings, based on a selection instructing a signal generated by an operation in the operation input unit 3, and category specifying means 45 for specifying a shift of each of the appearance frequencies P1 to P8 in the character string dictionary 1a, based on a category specifying signal generated by an operation in the operation input unit 3.

Herein, each of the above-mentioned means 41, 42, 44, 45, and 451 is constructed in a CPU (central processing unit) and a peripheral apparatus, and the dictionary 1a is constructed in a storage device such as a ROM.

The other structure of the character input function portion 410b is the same as that of the character input apparatus 100 of Embodiment 1.

Next, an operation of the portable information communication apparatus 400 will be described.

Herein, manipulation and operation of input of a sentence in the portable information communication apparatus 400 will be described by exemplifying input of the sentence "I will eat dinner tonight before coming home".

First, a state where the word "I" is selected will be described with reference to FIGS. 18 to 20.

Figure 18A:
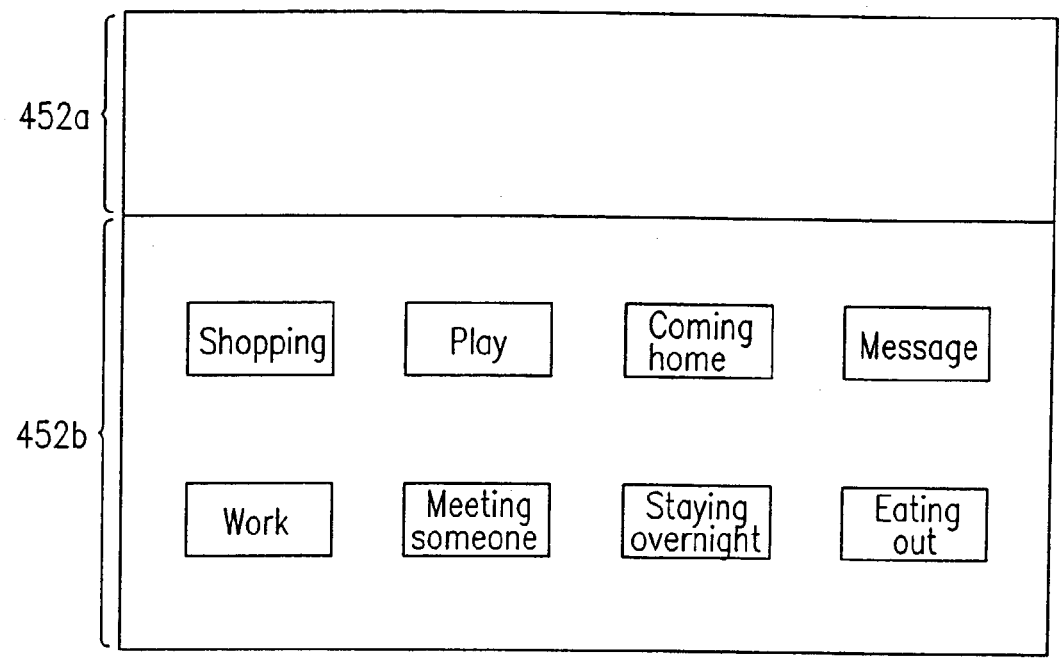
FIG. 18A shows a category selection menu displayed in a candidate character string display region on a display screen in the portable information communication apparatus of Embodiment 4.
Figure 19A:
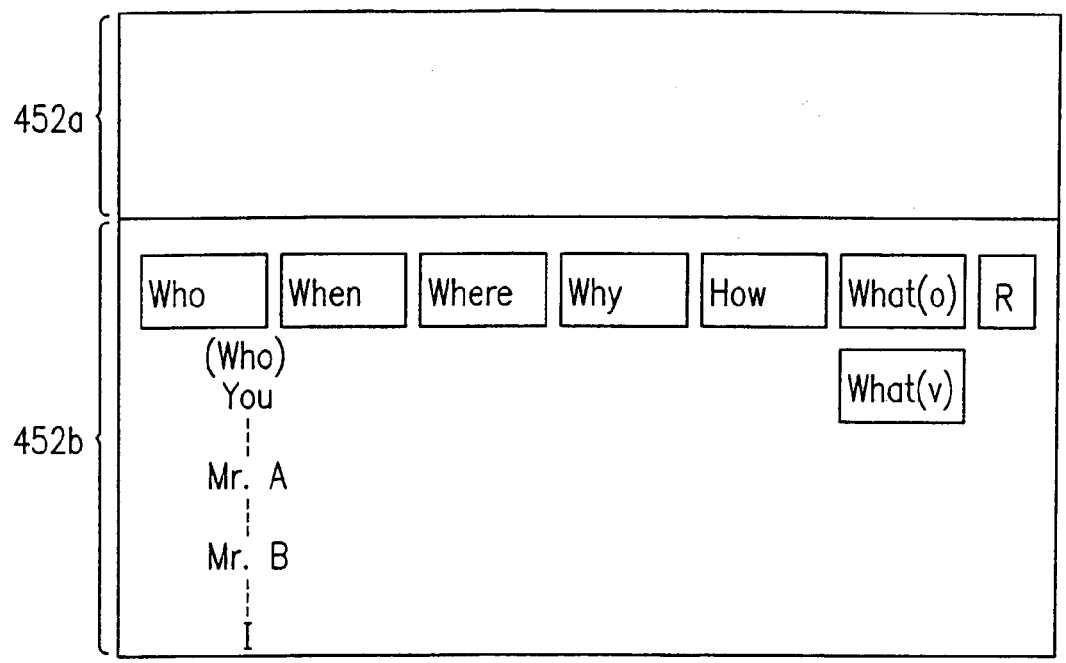
FIG. 19A shows candidate character strings listed in a candidate string display region when [Who] is specified from 5W1H in the portable information communication apparatus of Embodiment 4.

When the portable information communication apparatus 400 is switched on, and a mode for operating the character input function portion 410b is selected, first, a category selection screen is displayed on a candidate character string display region 452b. More specifically, as shown in FIG. 18A, 8 categories: (Shopping), (Play), (Coming home), (Message), (Work), (Meeting someone), (Staying overnight), and (Eating out) are displayed in horizontal two lines. When a user presses a display portion corresponding to (Eating out) on the display screen 103 with the input pen 102, the appearance frequency P8 at which appearance frequencies of the registered words related to (Eating out) are high is specified by the category specifying means 45. In this case, character strings are extracted from the character string dictionary 1a based on the appearance frequency P8.

Figure 18B:
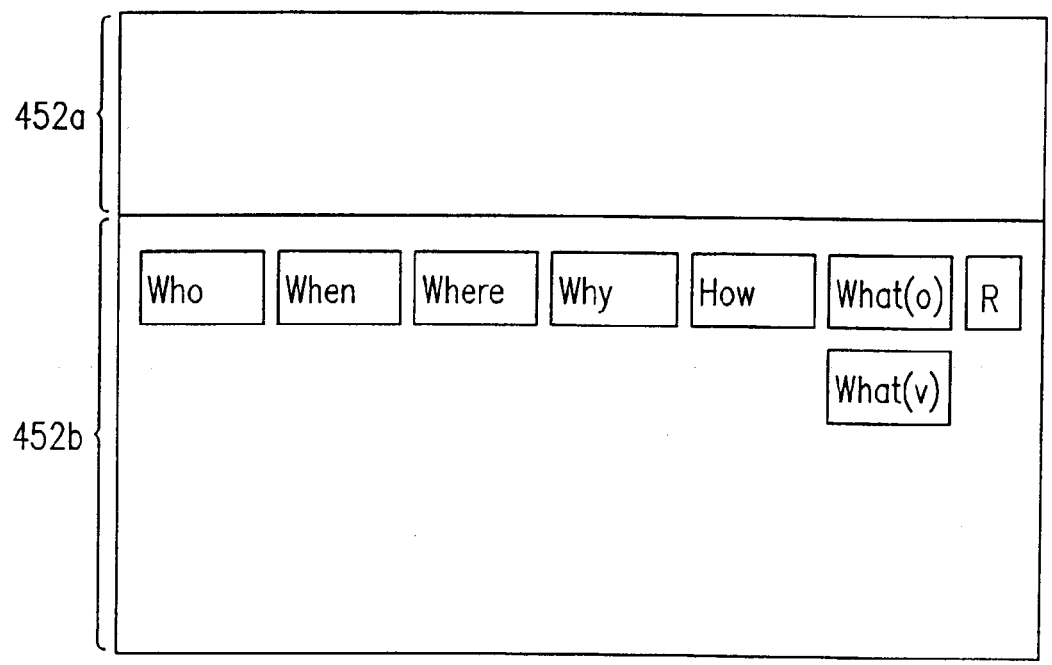
FIG. 18B shows an initial screen for specifying a character string belonging to either of 5W1H (i.e., Who, When, Where, Why, What, and How) displayed in a candidate character string display region after category selection.

When a category is selected as described above, a menu for determining one of 5W1H (i.e., Who, When, Where, Why, What, and How) to which a desired character string belongs is displayed in the candidate character string display region 452b as shown in FIG. 18B.

Herein, (Who) is operated in the case of extracting a subject, (When) is operated in the case of extracting words representing a time, (Where) is operated in the case of extracting words representing a place, (Why) is operated in the case of extracting words representing a reason, (How) is operated in the case of extracting words representing a state and an appearance, (What(o)) is operated in the case of extracting an object, (What(v)) is operated in the case of extracting registered phrases representing motion and action, and (R) is operated in the case of returning the screen to the category selection screen.

Figure 20A:
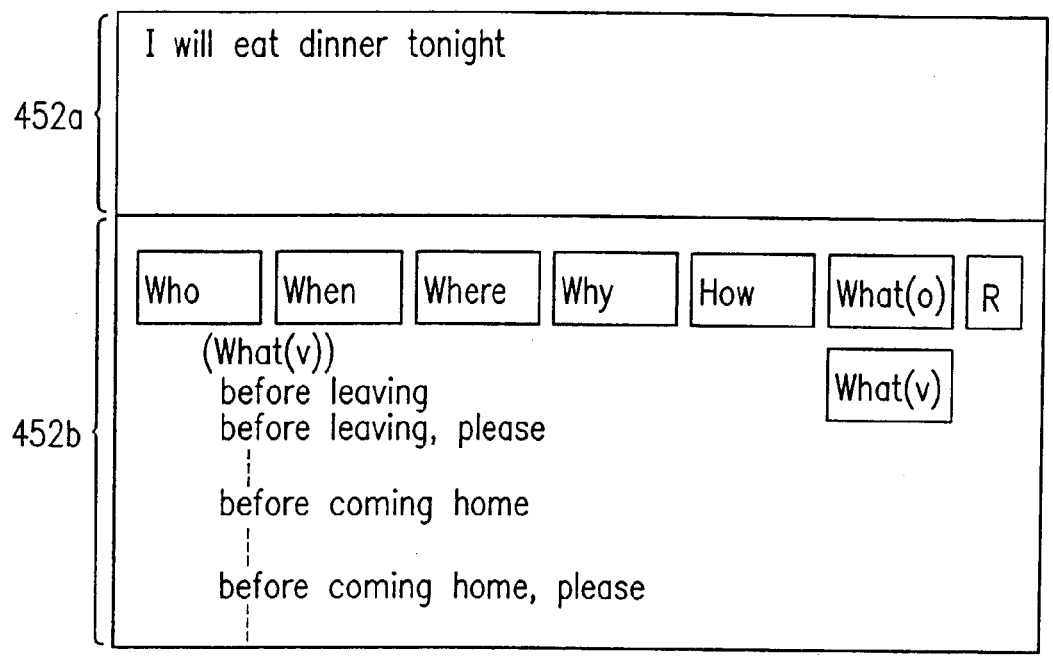
FIG. 20A shows candidate character strings listed in a candidate character string display region when [What(v)] is specified from 5W1H after "I eat dinner tonight" is selected in the portable information communication apparatus of Embodiment 4.

When the user presses a display portion of (Who) on the display screen 103 with the input pen 102 in the display state shown in FIG. 18B, "(Who)" for forming an interrogative sentence is displayed in the candidate character string display region 452b, together with registered words to be extracted as a subject, such as "You", . . . , "Mr. A", . . . , "Mr. B", . . . , "I", as shown in FIG. 19A.

Figure 19B:
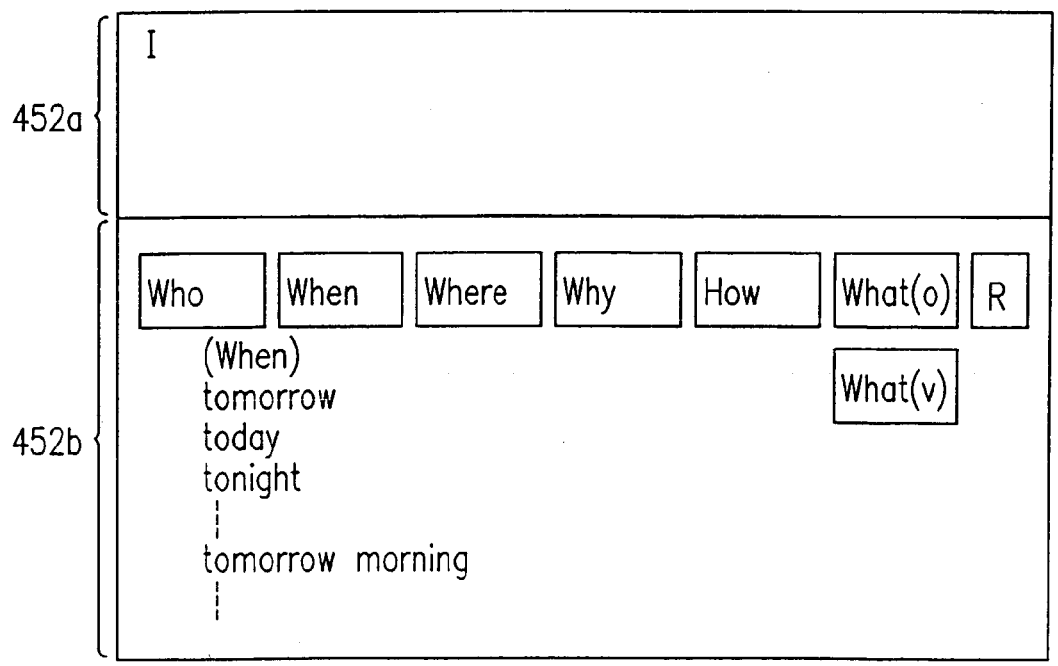
FIG. 19B shows candidate character strings listed in a candidate character string display region when [When] is specified from 5W1H after the character string "I" is selected.
Figure 20B:
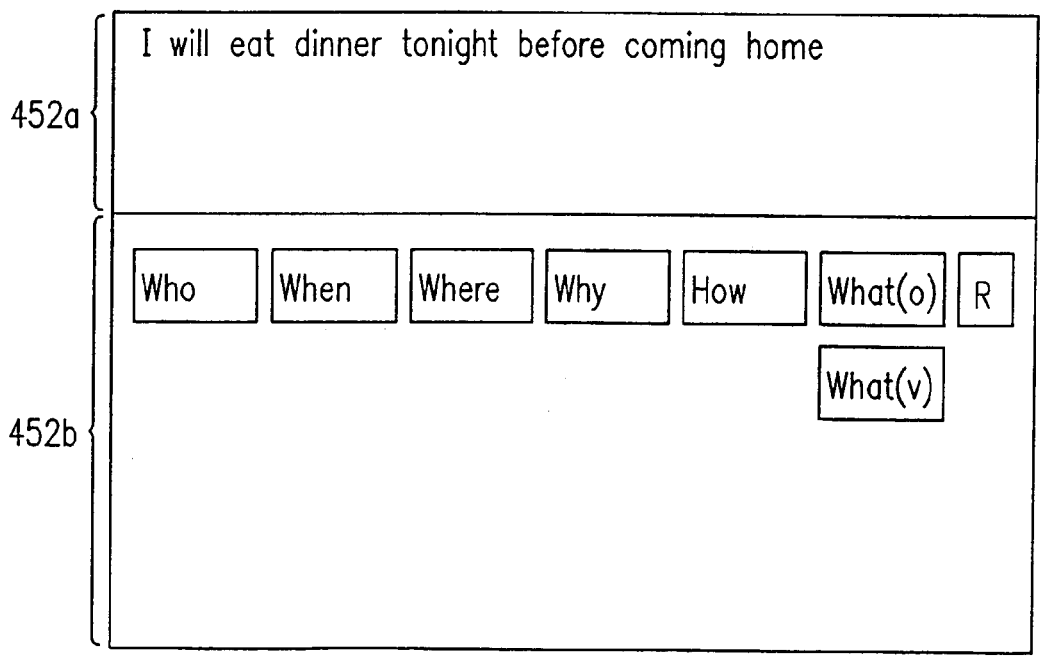
FIG. 20B shows a display state on a display screen after "before coming home" is selected.

At this time, in the case where the intended registered word is "I", when the user presses a display portion of "I" on the display screen 103 with the input pen 102, the registered word "I" is selected as a subject, and as shown in FIG. 19B, the registered word "I" is displayed in a selection character string display region 452a. When the user further presses a display portion of (When) on the display screen 103 with the input pen 102, "(When)" for forming an interrogative sentence is displayed in the candidate character string display region 452b, together with registered words to be extracted as words representing a time, such as "tomorrow", "today", "tonight", . . . , "tomorrow morning", However, in the case where the intended registered word is not displayed in the candidate character string display region 452b at a time when the user presses a display portion of (Who) on the display screen 103 with the input pen 102, or in the case where the intended registered word is not displayed in the candidate character string display region 452b at a time when the user presses a display portion of (When) on the display screen 103 with the input pen 102, a range of registered words to be extracted from the character string dictionary 1a is enlarged by an operation of the input pen 102 in the same way as in the character input apparatus 100 of Embodiment 1, whereby the intended registered word can be displayed in the candidate character string display region 452b.

More specifically, a position where the intended registered word is present is specified, which is in the vicinity of the left side of the candidate character string display region 452b and between display portions of predetermined registered words displayed adjacent to each other in the up and down direction. While the input pen 102 is kept so as to specify the position between the display portions of two registered words adjacent to each other in the up and down direction and the input pen 102 is pressed down, the input pen 102 is moved to the right. Such an input operation allows the changing means 42 to gradually decrease an extraction threshold value, and words having a low appearance frequency come to be displayed with respect to the specified position. This enables the intended registered word to be displayed in the candidate character string display region 452b.

Thereafter, an operation as described above is repeated. When a display portion of (What(v)) is pressed with the input pen 102 after "I eat dinner tonight" is input, "(What(v))" for writing an interrogative sentence is displayed in the candidate character string display region 452b, together with registered phrases to be extracted as those representing action, such as "before leaving", "before leaving, please", . . . , "before coming home", . . . , "before coming home, please", . . . (see FIG. 20A).

When the user presses a display portion of (coming home) on the display screen 103 with the input pen 102, the registered phrase "before coming home" is selected, and "I will eat dinner tonight before coming home" is displayed in the selection character string display region 452a.

Figure 21:
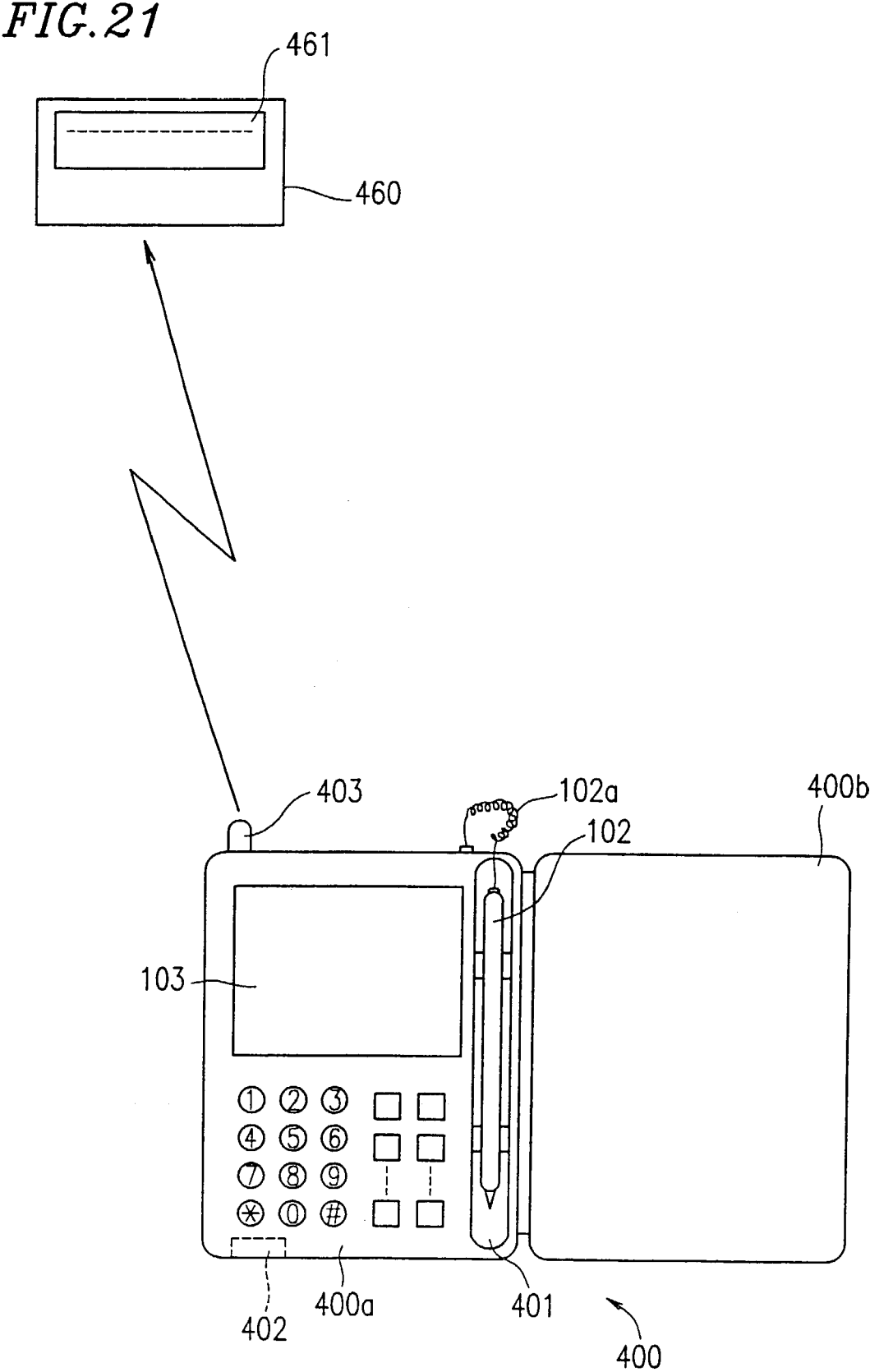
FIG. 21 shows a state where a document created by the portable information communication apparatus of Embodiment 4 is sent to a small portable communication apparatus (pocket bell) dedicated for receiving information.
Figure 23:
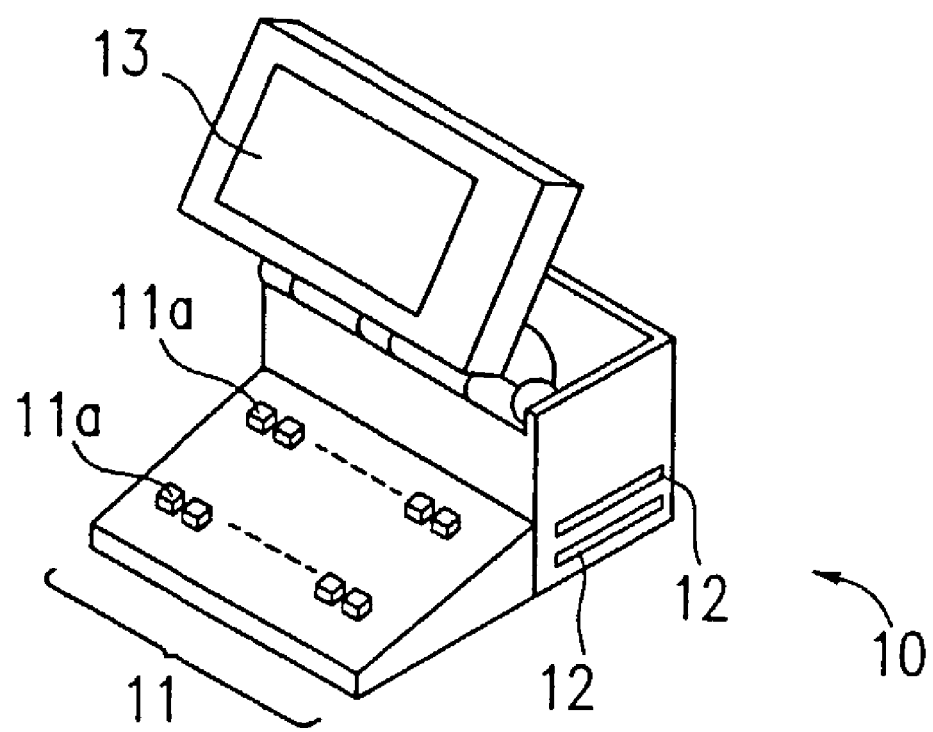
FIG. 23 shows an external appearance of a conventional general document input apparatus.

When the message thus written is sent to portable small communication equipment 460 dedicated for receiving, such as a pager unit, by the mobile telephone function portion 410a of the portable information communication apparatus 400, as shown in FIG. 21, the message "I will eat dinner tonight before coming home" is displayed on a display screen 461 of the pager unit 460. Furthermore, the message thus written can be sent to an ordinary telephone to be stored in its recording device.

Alternatively, as shown in FIG. 22, a socket for connecting a cable is provided in the portable information communication apparatus 400, and the communication apparatus 400 is designed so as to be connected to the conventional word processor 10 through a connection cable 470, whereby the message thus written can be stored in a floppy disk.

The embodiments of the present invention are not limited to the above. For example, the following alterations can be used.

(1) In each of the above-mentioned embodiments, the character input apparatuses which are intended for inputting Japanese sentences have been shown. However, the character input apparatus of the present invention is applicable to any language.

For example, in the case where the character input apparatus having a structure as described in Embodiment 1 is used for inputting English sentences, character strings should be stored in the character string dictionary in an alphabetical order, grammar information (e.g., the original form of a verb comes after an auxiliary verb) should be included in the grammar dictionary, and only the original form of a verb should be extracted as character strings following an auxiliary verb, based on part of speech information in the character string dictionary.

Furthermore, in this case, the candidate character string extracting portion may be designed so that the original form of a verb is extracted from the character string dictionary under the condition that a predetermined value is added to an appearance frequency of the original form of a verb. Furthermore, in the case where registered words are extracted after an article or a preposition, an adjective and a noun may be extracted from the character string dictionary under the condition that a predetermined value is added to appearance frequencies of an adjective and a noun.

Furthermore, a character string dictionary which stores both Japanese character strings and English character strings is provided, and means for switching an input mode of character strings between Japanese and English is provided, whereby character strings in a plurality of languages can be input.

(2) Appearance frequencies of character strings are classified based on the category of a document to be written, such as a letter, a thesis, and a novel, in the character string dictionary in the above-mentioned embodiments, and character strings are extracted from the character string dictionary based on an appearance frequency corresponding to the same category as that related to the meaning of a sentence which is being input. Thus, character strings can be extracted and searched at a satisfactory efficiency.

(3) In the above-mentioned embodiments, character strings are extracted and displayed from the character string dictionary with reference to appearance frequencies and grammar information. However, providing a mechanism in which a context of a sentence which is being input is provided, in addition to appearance frequencies and grammar knowledge, character strings may be extracted and displayed with reference to a content.

For example, "see", "enjoy", "appreciate", and the like are preferentially displayed as candidate character strings which are to follow the word "movie". In this case, homonymous character strings (in Japanese) "intervene", "buffer" and the like of the character string "appreciate" will not be displayed preferentially with respect to the word "appreciate", and hence, character strings can be extracted efficiently and a sentence can be input rapidly.

Furthermore, the character input apparatus of the present invention can be constructed in a computer. Thus, the present invention also includes a recording medium which stores a program for constructing the character input apparatus in a computer.

INDUSTRIAL APPLICABILITY

As described above, in the character input apparatus of the present invention, candidate character strings listed at the initial time are shifted on the display screen, and listed candidate character strings are continuously changed until the intended candidate character string appears on the display screen, by an operation such as changing of a coordinate of a specified position on a two-dimensional display screen, using a mouse, a tablet, or the like as the operation input member. Therefore, a word, a clause, or a sentence can be successively input as a character string by selecting an appropriate character string from a list of candidate character strings which dynamically change by a selection operation of the operation input unit. Thus, unlike input of characters by using a keyboard, there is no dependence on language in an input operation, and a sentence can, be correctly input, even in the case where spellings of Chinese characters in Japanese, English, etc. are not known.

Furthermore, in one embodiment, the character string dictionary, the candidate character string extracting portion, the display means, and the display control means are provided in an information equipment body, and the operation input unit is provided in a remote control device for remotely controlling the information equipment body. Therefore, for example, in information equipment such as a network TV, a document for E-mail which is required for access to the internet can be easily written by operating a remote controller.

Furthermore, in one embodiment, a selection character string display region for displaying the selected character string and a candidate character string display region for listing candidate character strings from which the character string is selected are set on the display screen of the display means. Therefore, there is an effect that it becomes easy to distinguish the candidate character strings from the selected character string on the display screen.

Furthermore, in one embodiment, the candidate character string extracting portion repeats first processing of extracting character strings whose extraction priorities are larger than the extraction threshold value from the character string dictionary and second processing of changing the extraction threshold value based on the threshold value change instructing signal generated by an operation in the operation input unit. Therefore, there is an effect that in the case where there is no intended candidate character string in candidate character strings listed on the display screen, the intended character string can be searched efficiently and rapidly by an operation in the operation input unit.

Furthermore, in one embodiment, a predetermined candidate character string is selected from a plurality of candidate character strings listed on the display screen by an operation in the operation input unit. Therefore, when the intended character string is displayed as a candidate character string on the display screen, this character string can be selected by the operation input unit. Thus, a required sentence can be input by placing the selected character string after the previously selected character string by an operation of the operation input unit.

Furthermore, in one embodiment, character strings, which may come next to the latest selected character string, are extracted as candidate character strings, based on the part of speech information read from the character string dictionary and the grammar information stored in the grammar dictionary. Therefore, a list of candidate character strings to be displayed next on the display screen is determined based on grammar knowledge in the process of a sentence input operation, so that the intended character strings can be searched at a high speed.

Furthermore, in one embodiment, an appearance frequency of each character string in the character string dictionary is updated in accordance with the number of appearances and the like, and character strings having large appearance frequencies are preferentially extracted as candidate character strings from the character string dictionary, considering that larger appearance frequencies correspond to higher extraction priorities. Therefore, a list of candidate character strings listed on the display screen can have a high hit rate (i.e., a high possibility of containing the intended character string), and the intended character string can be searched at a high speed.

Furthermore, in one embodiment, a tabletop apparatus body having high processing ability has a burdensome processing function of extracting a list of candidate character strings from the character string dictionary. Therefore, transportability of a portable terminal portion provided with the operation input unit and the display means can be prevented from being impaired.

Furthermore, in one embodiment, the character string dictionary includes dictionary information as a language dictionary which stores information of a meaning of each character string, as well as each of the character strings, and information of a meaning of a desired character string is displayed in a window for displaying a meaning formed on the display screen by an operation of the operation input unit. Therefore, a meaning of a selected character string or meanings of listed candidate character strings from which a character string is selected can be confirmed in the process of a sentence input operation.

Furthermore, in one embodiment, the language of character strings to be input is Japanese or Chinese, a plurality of character strings are stored in an order based on a pronunciation thereof in the character string dictionary, and homonymous character strings are stored in an order based on the number of strokes (in a Chinese character) of a first character included in each of the character strings. Therefore, there is an effect that even in the case where the number of homonymous character strings is larger than the number which can be displayed, a user can search the intended character string, based on the second ordering element such as the number of strokes as well as Japanese phonetic characters.

The invention claimed is:

1. A character input apparatus, comprising:
a character string dictionary which stores a number of character strings each including at least one character and having a predetermined meaning, in a predetermined storage order; and an operation input unit which generates various instructing signals in accordance with an operation of an operator, the apparatus selecting a character string from the character string dictionary based on the instructing signal and inputting the character string, the apparatus comprising:
display means having a display screen for displaying the selected character string and listing candidate character strings from which the character string is selected; the character string dictionary being constituted to store each character string at least together with speech information based on the grammar of a language of the character strings to be input, and
a grammar dictionary which stores grammar information including a conjunction relationship between character strings disposed adjacent to each other, determined by the part of speech of the character strings in language of the character strings to be input, and
wherein the candidate character string extracting portion, regarding a latest character string among the character strings selected by the selecting means, extracts character strings, which may come next to the latest selected character string, as candidate character strings from the character string dictionary, based on the read part of speech information and the grammar information stored in the grammar dictionary; and
wherein the character string dictionary, the candidate character string extracting portion, the display means, and the display control means are provided in an information equipment body for displaying and processing communication information, the operation input unit is provided in a remote control device separated from the information equipment body, for remotely controlling the information equipment body,
a position specifying signal generated by an operation of the position specifying member in the operation input unit and the selection instructing signal generated by an operation in the operation input unit are transmitted from a transmitting portion of the remote control device to the information equipment body, a position is specified on the display screen of the display means provided in the information equipment body, based on the transmitted position specifying signal, and the candidate character strings are selected by the selecting means, based on the transmitted selection specifying signal.

2. A character input apparatus, comprising:
a character string dictionary which stores a number of character strings each including at least one character and having a predetermined meaning, and
an operation input unit which generates various instruction signals in accordance with an operation of an operator,
the apparatus adopting to select a character string from the character string dictionary based on the instruction signals and to input the character string, and further comprising a display output means for providing an output to display the selected character string and to display a candidate character string which becomes an object of selecting the character string,
wherein the operation input unit has a function for specifying a category of a sentence to be inputted and a function for specifying a role of Who, When, Where, Why, What, and How (5W1H) which are operated by the character string to be inputted within the sentence, and
wherein the string character having been stored in the character string dictionary is given appearance frequencies at each of every category and information of whether it is used for every role of 5W1H, and
the string character to be used for the specified role is extracted on the employment of appearance frequencies corresponding to the specified category to display as the candidate character string.

3. A character input apparatus according to claim 2, wherein the categories are classified in view of living scene.

4. A character input apparatus according to claim 2, wherein the categories are classified in view of kinds of preparation documents.

5. A character input apparatus according to claim 2, wherein the candidate character string extracting portion, regarding a latest character string among the character strings selected by selecting means, extracts character strings, which may come next to the latest selected character string, as candidate character strings from the character string dictionary, based on the read part of speech information and the grammar information stored in the grammar dictionary.

6. A character input apparatus, comprising:
a character string dictionary which stores a number of character strings each including at least one character and having a predetermined meaning, and an operation input unit which generates various instruction signals in accordance with an operation of an operator, the apparatus adopting to select a character string from the character string dictionary based on the instruction signals and to input the character string, the operation input unit providing with an function for specifying a category of a sentence to be inputted, and the apparatus further comprising a display output means for providing an output to display the selected character string and to display a candidate character string which becomes an object of selecting the character string, and a grammar dictionary which stores grammar information including a conjunction relationship to be determined by a part of speech of the character string disposed before and/or after the character string between the character strings, in language of the character strings to be input, wherein a string character which is possible to come to the next of the latest selected string character is extracted as a candidate character string from the character string dictionary based on appearance frequencies of the character string in the specified category and grammar information including a conjunction relationship stored in the grammar dictionary together with a part of speech of the character string with respect to the latest selected one among the selected character strings based on the instruction signals of the operation input unit.

7. A character input apparatus according to claim 6, wherein the categories are classified in view of living scene.

8. A character input apparatus according to claim 6, wherein the categories are classified in view of kinds of preparation documents.

9. A character input apparatus according to claim 6, wherein the candidate character string extracting portion, regarding a latest character string among the character strings selected by selecting means, extracts character strings, which may come next to the latest selected character string, as candidate character strings from the character string dictionary, based on the read part of speech information and the grammar information stored in the grammar dictionary.

10. A character input apparatus, comprising:

a character string dictionary which stores character strings each including at least one character and having a predetermined meaning, in a predetermined storage order;

a conjunction relationship dictionary which stores a conjunction relationship between character strings disposed adjacent to each other in a language used for the character strings to be input;

a candidate character string extracting portion including extracting means for extracting character strings from all the character strings stored in the character string dictionary as candidate character strings, based on a latest inputted character string and the conjunction relationship dictionary;

display control means for controlling a display means in such a manner that the candidate character strings extracted by the candidate character string extracting portion are listed on a display screen, and the latest inputted character strings are discriminatively displayed on the display screen; and selection means for selecting a predetermined character string as a character string to be input from the plurality of candidate character strings listed on the display screen in accordance with instruction signals from an operation input unit.

11. The character input apparatus of claim 10, wherein the conjunction relationship dictionary is based on the conjunction relationship between character strings determined by a part of speech information of the character strings.

* * * * *